(12) United States Patent
Moshe

(10) Patent No.: US 7,411,682 B2
(45) Date of Patent: Aug. 12, 2008

(54) REAL TIME HIGH SPEED HIGH RESOLUTION HYPER-SPECTRAL IMAGING

(75) Inventor: Danny S. Moshe, Kiryat Ono (IL)

(73) Assignee: Green Vision Systems Ltd., Tel-Aviv (IL)

( * ) Notice: Subject to any disclaimer, the term of this patent is extended or adjusted under 35 U.S.C. 154(b) by 304 days.

(21) Appl. No.: 10/508,960

(22) PCT Filed: Apr. 7, 2003

(86) PCT No.: PCT/IL03/00292

§ 371 (c)(1),
(2), (4) Date: Oct. 6, 2004

(87) PCT Pub. No.: WO03/085371

PCT Pub. Date: Oct. 16, 2003

(65) Prior Publication Data

US 2005/0275847 A1    Dec. 15, 2005

(30) Foreign Application Priority Data

Apr. 7, 2002    (IL) .................................. 149016

(51) Int. Cl.
*G01B 9/02* (2006.01)
(52) U.S. Cl. ....................... 356/452; 356/456
(58) Field of Classification Search ............. 356/451, 356/452, 456
See application file for complete search history.

(56) References Cited

U.S. PATENT DOCUMENTS

| | | | |
|---|---|---|---|
| 4,444,501 A * | 4/1984 | Schwiesow | 356/452 |
| 5,216,484 A | 6/1993 | Chao et al. | |
| 5,253,183 A * | 10/1993 | Inoue et al. | 356/453 |
| 5,377,003 A | 12/1994 | Lewis et al. | |
| 5,379,065 A | 1/1995 | Cutts | |
| 5,410,371 A | 4/1995 | Lambert | |
| 5,440,388 A | 8/1995 | Erickson | |
| 5,442,438 A | 8/1995 | Batchelder et al. | |
| 5,486,917 A * | 1/1996 | Carangelo et al. | 356/452 |
| 5,539,517 A | 7/1996 | Cabib et al. | |
| 5,556,790 A | 9/1996 | Pettit | |
| 5,591,981 A | 1/1997 | Heffelfinger et al. | |
| 5,784,152 A | 7/1998 | Heffelfinger et al. | |
| 5,784,162 A | 7/1998 | Cabib et al. | |
| 5,801,830 A * | 9/1998 | Seago et al. | 356/454 |
| 5,817,462 A | 10/1998 | Garini et al. | |
| 5,835,214 A | 11/1998 | Cabib et al. | |
| 5,880,830 A | 3/1999 | Schechter | |
| 5,949,543 A * | 9/1999 | Bleier et al. | 356/451 |

(Continued)

Primary Examiner—Samuel A Turner

(57) ABSTRACT

Real time high speed high resolution hyper-spectral imaging. (a) electromagnetic radiation collimating element (16), collimating electromagnetic radiation (44) emitted by objects (12) in a scene or a sample (14); (b) optical interferometer (18), receiving and dividing collimated object emission beam, generating interference images, and determining and piezoelectrically changing magnitude of optical path difference of divided collimated object emission beam; optical interferometer (18) includes: beam splitter (20'), fixed mirror (22), movable mirror (24), piezoelectric motor (26), displacing movable mirror (24) along axis (60), distance change feedback sensor (28), sensing and measuring change in distance of movable mirror (24) along axis (60), piezoelectric motor controller (30), actuating and controlling piezoelectric motor (26); and thermo-mechanically stable optical interferometer mount (32A); (c) camera optics (34), focusing interference images of each optical path difference; (d) detector (36), recording interference images; (e) central programming and signal processing unit (38), and (f) display (40).

107 Claims, 6 Drawing Sheets

U.S. PATENT DOCUMENTS 6,088,099 A * 7/2000 Cabib et al. ................. 356/456
6,091,843 A    7/2000 Horesh et al.
6,697,160 B2 * 2/2004 Tsuda ........................ 356/453

* cited by examiner though, by moving an element within the interferometer, or
REAL TIME HIGH SPEED HIGH RESOLUTION HYPER-SPECTRAL IMAGING This application is a National Phase Application of PCT/IL03/00292 having International Filing Date of 7 Apr. 2003, which claims priority from Israel Patent Application No. 149016 filed 7 Apr. 2002.

FIELD AND BACKGROUND OF THE INVENTION

The present invention relates to spectral imaging and, more particularly, to a method and system for real time high speed high resolution hyper-spectral imaging. The present invention is based on using piezoelectric technology with closed loop control and analysis algorithms, for enabling real time high speed high resolution nanometer accuracy movement of a movable mirror in an optical interferometer, along with using a specially designed and constructed optical interferometer mount as part of the optical interferometer, for achieving high thermo-mechanical stability of mounted optical interferometer components during the real time hyper-spectral imaging. Implementation of the present invention results in high speed collecting of high resolution interferogram images used for synthesizing and analyzing high resolution highly reproducible three-dimensional hyper-spectral (cube) images.

In the general technique of spectral imaging, in most applications, one or more objects in a scene or sample are affected in a way, such as excitation by incident electromagnetic radiation, for example, ultraviolet radiation, supplied by an external source of the electromagnetic radiation, upon the objects, which causes each object to emit electromagnetic radiation in the form of an emission beam featuring an emission spectrum. There are some applications of spectral imaging which don't require an external source of electromagnetic radiation for causing emission by objects, for example, as a result of inherent (body) thermal heat emitted by objects in a scene or sample.

A typical spectral imaging system consists of an automated measurement system and analysis software. The automated measurement system includes optics, mechanics, electronics, and peripheral hardware and software, for irradiating (typically using an illuminating source) a scene or sample, followed by measuring and collecting light emitted (for example, by fluorescence) from objects in the scene or sample, and for applying calibration techniques best suited for extracting desired results from the measurements. Analysis software includes software and mathematical algorithms for analyzing, displaying, and presenting, useful results about the objects in the scene or sample in a meaningful way.

The spectral intensity of each pixel in an optical image of a scene or sample is determined by collecting incident light emitted by objects in the scene or sample, passing the light through an optical interferometer which outputs modulated light corresponding to a set of linear combinations of the spectral intensity of the light emitted from each pixel. Light exiting from the interferometer is focused onto a detector array or matrix, followed by independently and simultaneously scanning the optical path difference (OPD) generated in the interferometer for all pixels, and then processing the outputs of the detector array (a plurality of separate interferograms of all pixels) for determining the spectral intensity of each pixel needed for generating spectral (cube) images. Spectral imaging is practiced by utilizing various different types of interferometers wherein the OPD is varied, in order to synthesize the interferograms, by moving the entire interferometer, by moving an element within the interferometer, or by changing the angle of incidence of the incoming radiation. In each case, optical scanning of the interferometer enables synthesizing interferograms for all pixels of the imaged scene.

Each spectral (cube) image is a three dimensional data set of voxels (volume of pixels) in which two dimensions are spatial coordinates or position, (x, y), in an object and the third dimension is the wavelength, ($\lambda$), of the imaged (emitted) light of the object, such that coordinates of each voxel in a spectral (cube) image may be represented as (x, y, $\lambda$). Any particular wavelength, ($\lambda$), of imaged light of the object is associated with a set of spectral (cube) images each featuring spectral fingerprints of the object in two dimensions, for example, along the x and y directions, whereby voxels having that value of wavelength constitute the pixels of a monochromatic image of the object at that wavelength. Each spectral (cube) image, featuring a range of wavelengths of imaged light of the object is analyzed to produce a two dimensional map of one or more physicochemical properties, for example, geometrical shape, form, or configuration, and dimensions, and/or chemical composition, of the object and/or of components of the object, in a scene or sample.

An example of a spectral imaging technique is that of a method and system for real-time, on-line chemical analysis of particulate samples, for example, polycyclic aromatic hydrocarbon (PAH) particles in aerosols, in which the PAH sample is excited to emit light, for example fluorescence, as disclosed in U.S. Pat. No. 5,880,830, issued to Schechter, and manufactured by GreenVision Systems Ltd. of Tel Aviv, Israel, the disclosure of which is incorporated by reference for all purposes as if fully set forth herein. In the disclosed invention, spectral imaging techniques are used for acquiring images and analyzing properties of fixed position PAH particles in an aerosol. As part of the invention, air is sampled by means of a high volume pump sucking a large volume of air featuring aerosol contaminated with PAH particles onto a substrate, followed by on-line imaging and scene analysis of the stationary particles.

A method of calibration and real-time analysis of particles is described in U.S. Pat. No. 6,091,843, to Moshe et al., and is incorporated by reference for all purposes as if fully set forth herein. The method described, is based on using essentially the same system of U.S. Pat. No. 5,880,830, for acquiring spectral images of static particles on a filter. Targets are identified in static particle images and are classified according to morphology type and spectrum type. Each target is assigned a value of an extensive property. A descriptor vector is formed, where each element of the descriptor vector is the sum of the extensive property values for one target class. The descriptor vector is transformed, for example, to a vector of mass concentrations of chemical species of interest, or of number concentrations of biological species of interest, using a relationship determined in the calibration procedure. In the calibration procedure, spectral images of calibration samples of static particles having known composition are acquired, and empirical morphology types and spectrum types are inferred from the spectral images. Targets are identified in the calibration spectral images, classified according to morphology type and spectrum type, and assigned values of an extensive property. For each calibration sample, a calibration descriptor vector and a calibration concentration vector is formed. A collective relationship between the calibration descriptor vectors and the calibration concentration vectors is found using chemometric methods.

In the method of U.S. Pat. No. 6,091,843, standard spectra are determined empirically in the calibration procedure. In such analytical procedures, empirical calibration is quite important for leading to highly accurate results based on image analysis and classification, because spectra of adsorbed chemical species in general, and, of PAHs in particular, are known to be altered by the surfaces on which they are adsorbed, and by the presence of contaminants during sample preparation and image acquisition. Moreover, in the described method, the relationship between the descriptor vector and the concentration vector accounts explicitly and simultaneously for both morphologies and empirically determined spectra.

In the more specialized technique of 'hyper-spectral' imaging, multiple images of each object are generated from object emitted electromagnetic radiation having wavelengths and frequencies associated with different selected parts or 'bands' of an entire spectrum emitted by the object. For example, hyper-spectral images of an object are generated from object emitted electromagnetic radiation having wavelengths and frequencies associated with one or more of the following bands of an entire spectrum emitted by the object: the visible band, spanning the wavelength range of about 400-700 nanometers, the infra-red (1R) band, spanning the wavelength range of about 800-1200 nanometers, and the deep infra-red band, spanning the wavelength range of about 3-12 microns. If proper wavelengths and wavelength ranges are used during hyper-spectral imaging, data and information of the hyper-spectral images are optimally used for detecting and analyzing by identifying, discriminating, classifying, and quantifying, the imaged objects and/or materials, for example, by analyzing different signature spectra present in pixels of the hyper-spectral images.

'High speed' hyper-spectral imaging system is required for different types of repeatable and non-repeatable chemical and physical processes taking place during the sub-100 millisecond time scale and cannot, therefore, be studied using regular hyper-spectral imaging techniques. Combustion reactions, impulse spectro-electrochemical experiments, and inelastic polymer deformations, are examples of such processes. Remote sensing of objects in distant scenes from rapidly moving platforms, for example, satellites and airplanes, is another example of a quickly changing observable that is often impossible to repeat, and therefore requires high speed hyper-spectral imaging.

There are prior art teachings about hyper-spectral imaging which can be used for obtaining hyper-spectral images of objects in a scene or sample. Specific hardware for hyper-spectral imaging includes filter wheels and circular variable filters as disclosed in U.S. Pat. No. 5,591,981, U.S. Pat. No. 5,784,152, and U.S. Pat. No. 5,410,371; angle-tuned interference filters as in the Renishaw imaging Raman microscope described in U.S. Pat. No. 5,442,438; acousto-optical tunable filters (AOTFs) as disclosed in U.S. Pat. No. 5,216,484, U.S. Pat. No. 5,377,003, U.S. Pat. No. 5,556,790, and U.S. Pat. No. 5,379,065; optical interferometers as disclosed in U.S. Pat. No. 5,835,214, U.S. Pat. No. 5,817,462, U.S. Pat. No. 5,539,517, and U.S. Pat. No. 5,784,162. However, none of these prior art teachings disclose a method or system for enabling high speed grabbing and generating hyper-spectral (cube) images, self spatial and spectral calibration capabilities and procedures, and rapid tunable fast scanning rate of, for example, less than 50 millisecond for an entire spectral (cube) image, as required by more sophisticated applications of hyper-spectral imaging.

Currently available hyper-spectral imaging techniques are significantly limited by having insufficiently high speeds of generating and processing spectral (cube) images, and are limited by providing insufficiently high resolution of the spectral (cube) images, as a result of low thermo-mechanical stability of hyper-spectral imaging system components, for example, mounted components such as beam splitters and mirrors in an optical interferometer, along with inaccuracy in measuring the optical path difference (OPD) of a divided object emission beam. Additionally, current hyper-spectral imaging techniques are significantly limited when employed in the wavelength range of about 100 nm to about 800 nm. In this spectral range, during the generating and collecting of spectral data using prior art hyper-spectral imaging techniques, typically, spatial errors and spectral errors are intrinsically generated and translate directly to decreasing quality (resolution) and reproducibility of the hyper-spectral images of objects in a scene or sample.

There is thus a need for, and it would be highly advantageous to have a method and system for real time high speed high resolution hyper-spectral imaging. Moreover, there is a need for such an invention which is based on using piezoelectric technology with closed loop control and analysis algorithms, for enabling real time high speed high resolution nanometer accuracy movement of a movable mirror in an optical interferometer, along with using a specially designed and constructed optical interferometer mount as part of the optical interferometer, for achieving high thermo-mechanical stability of mounted optical interferometer components during the real time hyper-spectral imaging, resulting in high speed collecting of high resolution interferogram images used for synthesizing and analyzing high resolution highly reproducible three-dimensional hyper-spectral (cube) images.

SUMMARY OF THE INVENTION

The present invention relates to a method and system for real time high speed high resolution hyper-spectral imaging. The present invention is based on using piezoelectric technology with closed loop control and analysis algorithms, for enabling real time high speed high resolution nanometer accuracy movement of a movable mirror in an optical interferometer, along with using a specially designed and constructed optical interferometer mount as part of the optical interferometer, for achieving high thermo-mechanical stability of mounted optical interferometer components during the real time hyper-spectral imaging.

The optical interferometer features real time high speed high resolution nanometer accuracy displacement or movement of the movable mirror, enabled by operative connections and combined operation of a piezoelectric motor, a distance change feedback sensor, a piezoelectric motor controller, the specially designed and constructed thermo-mechanically stable optical interferometer mount, and the closed loop control and analysis algorithms.

The optical interferometer also features high thermo-mechanical stability, achieved by the thermo-mechanically stable optical interferometer mount, exhibiting extremely low mechanical sensitivity to temperature changes, functioning as a mount for optical interferometer components, in particular, a beam splitter, a fixed mirror, and the movable mirror, used for determining and changing the optical path distance (OPD) of a divided collimated object emission beam.

The optical interferometer mount exhibits specific mechanical and thermo-mechanical physicochemical properties, characteristics, and behavior, of high rigidity, high dimensional stability, extremely low thermal (thermo-mechanical) expansion or expansibility, and extremely low mechanical sensitivity to temperature changes, achieved by having an extremely low coefficient of thermal expansion (CTE), in particular, less than about $1.0 \times 10^{-4}/^\circ$ K, preferably, less than about $1.0 \times 10^{-5}/^\circ$ K, and more preferably, on the order of about $1.0 \times 10^{-6}/^\circ$ K. An extremely low coefficient of thermal expansion is especially needed in order to reduce dependency of the optical path difference (OPD) of the divided collimated object emission beam, and changes thereof, on changes (increases and/or decreases) in temperature.

The hyper-spectral imaging method and system feature a specially designed and implemented optical path distance (OPD) calibration, and image processing software algorithms, for enabling high speed (on the order of 50 milliseconds) generating of high spatial resolution and high spectral resolution interferogram images used for synthesizing and analyzing high resolution highly reproducible three-dimensional hyper-spectral (cube) images.

Different alternative specific configurations of the generalized preferred embodiment of the hyper-spectral imaging system, according to the specific geometrical shape of the beam splitter, according to the specific positions of the fixed mirror and the movable mirror relative to the beam splitter, and according to the corresponding specific configuration of the optical interferometer mount and optical interferometer components mounted thereon, in the optical interferometer, are each applicable for implementing the method of the present invention.

Thus, according to the present invention, there is provided a method for real time high speed high resolution hyper-spectral imaging, comprising the steps of: (a) emitting electromagnetic radiation in a form of an object emission beam, by objects in a scene or a sample, and collimating the object emission beam, using an electromagnetic radiation collimating element, for forming a collimated object emission beam; (b) receiving and dividing the collimated object emission beam by an optical interferometer, for generating an interference image; the optical interferometer includes: (i) a beam splitter, (ii) a fixed mirror, (iii) a movable mirror, whereby the fixed mirror and the movable mirror are located at a right angle to each other, and each mirror is oriented at a predetermined angle relative to beam splitting surface of the beam splitter positioned at vertex of a right angle between both mirrors, (iv) a piezoelectric motor, operatively connected to the movable mirror, for displacing the movable mirror along an axis of the divided collimated object emission beam, (v) a distance change feedback sensor, operatively connected to the movable mirror and operatively connected to the piezoelectric motor controller, for sensing and measuring change in distance or position of the movable mirror along the axis, (vi) a piezoelectric motor controller, operatively connected to the piezoelectric motor, and operatively connected to the distance change feedback sensor, for actuating and controlling the piezoelectric motor; and (vii) an optical interferometer mount, as a thermo-mechanically stable mount of the beam splitter, the fixed mirror, and the movable mirror of the optical interferometer; (c) piezoelectrically determining and changing magnitude of optical path difference of the divided collimated object emission beam, by the optical interferometer, for generating at least one interference image for each magnitude of the optical path difference; (d) focusing and recording each generated interference image associated with a corresponding magnitude of optical path difference, using camera optics and a detector, for forming a plurality of recorded interference images; (e) improving quality of the plurality of recorded interference images, for forming a plurality of improved quality interference images; and (f) transforming each of the plurality of improved quality interference images to frequency domain, for forming a corresponding plurality of interferogram images.

According to another aspect of the present invention, there is provided a system for real time high speed high resolution hyper-spectral imaging, comprising: (a) an electromagnetic radiation collimating element, for collimating electromagnetic radiation emitted by objects in a scene or a sample, for forming a collimated object emission beam; (b) an optical interferometer, for receiving and dividing the collimated object emission beam, for generating an interference image, and for piezoelectrically determining and changing magnitude of optical path difference of the divided collimated object emission beam, for generating at least one interference image for each magnitude of the optical path difference; the optical interferometer includes: (i) a beam splitter, (ii) a fixed mirror, (iii) a movable mirror, whereby the fixed mirror and the movable mirror are located at a right angle to each other, and each mirror is oriented at a pre-determined angle relative to beam splitting surface of the beam splitter positioned at vertex of a right angle between both mirrors, (iv) a piezoelectric motor, operatively connected to the movable mirror, for displacing the movable mirror along an axis of the divided collimated object emission beam, (v) a distance change feedback sensor, operatively connected to the movable mirror and operatively connected to the piezoelectric motor controller, for sensing and measuring change in distance or position of the movable mirror along the axis, (vi) a piezoelectric motor controller, operatively connected to the piezoelectric motor, and operatively connected to the distance change feedback sensor, for actuating and controlling the piezoelectric motor; and (vii) an optical interferometer mount, as a thermo-mechanically stable mount of the beam splitter, the fixed mirror, and the movable mirror of the optical interferometer; (c) camera optics, for focusing each generated interference image associated with a corresponding magnitude of optical path difference; (d) a detector, for recording each generated interference image, for forming a plurality of recorded interference images; and (e) a central programming and control/data/information signal processing unit, operatively connected to the piezoelectric motor controller and operatively connected to the detector, for programming and processing signals and for processing and analyzing the recorded interference images, for forming a corresponding plurality of interferogram images.

For each of the first and second alternative specific configurations of the generalized preferred embodiment of the hyper-spectral imaging system, wherein the optical interferometer features a rectangular shaped beam splitter, each exemplary corresponding specific configuration of the optical interferometer mount features the following primary components: (1) a fixed mount section, (2) a movable mount section, (3) a mounting location of the rectangular beam splitter on the fixed mount section, (4) a mounting location of the fixed mirror on the fixed mount section, (5) a mounting location of the movable mirror on the movable mount section, (6) a mounting location of the piezoelectric motor inside of the fixed mount section, (7) a mounting location of the distance change feedback sensor on the fixed mount section, and (8) a plurality of spring or spring-like motion/direction stabilizing elements, operatively connected to the fixed mount section and operatively connected to the movable mount section, for stabilizing motion and/or direction of the movable mount section, and therefore, for stabilizing motion and/or direction of the movable mirror during the real time high speed high resolution hyper-spectral imaging.

For each of the third and fourth alternative specific configurations of the generalized preferred embodiment of the hyper-spectral imaging system, wherein the optical interferometer features a cubic shaped beam splitter, each exemplary corresponding specific configuration of the optical interferometer mount features the following primary components: (1) a fixed mount section, (2) a movable mount section, (3) a mounting location of the cubic beam splitter, including location of the fixed mirror formed along an appropriate external edge of the cubic beam splitter, (4) a mounting location of the movable mirror on the movable mount section, (5) a mounting location of the piezoelectric motor inside of the fixed mount section, (6) a mounting location of the distance change feedback sensor on the fixed mount section, and (7) a plurality of spring or spring-like motion/direction stabilizing elements, operatively connected to the fixed mount section and operatively connected to the movable mount section, for stabilizing motion and/or direction of the movable mount section, and therefore, for stabilizing motion and/or direction of the movable mirror during the real time high speed high resolution hyper-spectral imaging.

In principle, the optical interferometer mount, including above listed components (1)-(8) thereof, is made of any type of single material, or of any combination of different types of materials, exhibiting the above described specific mechanical and thermo-mechanical physicochemical properties, characteristics, and behavior, of high rigidity, high dimensional stability, extremely low thermal (thermo-mechanical) expansion or expansibility, and extremely low mechanical sensitivity to temperature changes, achieved by featuring an extremely low coefficient of thermal expansion (CTE), in particular, less than about $1.0 \times 10^{-4}/°$ K, preferably, less than about $1.0 \times 10^{-5}/°$ K, and more preferably, on the order of about $1.0 \times 10^{-6}/°$ K.

Accordingly, the optical interferometer mount, including above listed components (1)-(8) thereof, is made of at least one type of material selected from the group consisting of metallic types of materials, solid non-metallic types of materials, and combinations thereof, exhibiting the above described specific mechanical and thermo-mechanical physicochemical properties, characteristics, and behavior. Metallic types of materials are selected from the group consisting of pure metallic types of materials and alloy or mixed metallic types of materials. Solid non-metallic types of materials are selected from the group consisting of pure solid non-metallic types of materials and mixed solid non-metallic types of materials.

A preferred alloy or mixed metallic type of material is selected from the group consisting of steels and stainless steels, exhibiting the above described specific mechanical and thermo-mechanical physicochemical properties, characteristics, and behavior, of high rigidity, high dimensional stability, extremely low thermal (thermo-mechanical) expansion or expansibility, and extremely low mechanical sensitivity to temperature changes, achieved by featuring an extremely low coefficient of thermal expansion (CTE).

More specifically, whereby the alloy or mixed metallic type of material is a steel alloy including at least one metal selected from the group consisting of nickel and cobalt. More specifically, whereby the steel alloy is selected from the group consisting of a steel alloy including about 36% nickel, a steel alloy containing steel and about 36% nickel, a steel alloy including about 36% nickel and up to about 5% cobalt, and, a steel alloy containing steel, about 36% nickel, and up to about 5% cobalt.

More specifically, whereby the alloy or mixed metallic type of material is a stainless steel alloy including at least one metal selected from the group consisting of nickel and cobalt. More specifically, whereby the stainless steel alloy is selected from the group consisting of a stainless steel alloy including about 36% nickel, a stainless steel alloy containing stainless steel and about 36% nickel, a stainless steel alloy including about 36% nickel and up to about 5% cobalt, and, a stainless steel alloy containing steel, about 36% nickel, and up to about 5% cobalt.

Preferably, the alloy or mixed metallic type of material used for making the optical interferometer mount, including above listed components (1)-(8) thereof, is a steel alloy selected from the group consisting of an INVAR steel alloy and an INVAR type of steel alloy. Alternatively, the alloy or mixed metallic type of material used for making the optical interferometer mount, including components thereof, is a stainless steel alloy selected from the group consisting of an INVAR stainless steel alloy and an INVAR type of stainless steel alloy.

INVAR steel alloys, INVAR types of steel alloys, INVAR stainless steel alloys, and INVAR types of stainless steel alloys, are well known in those fields, and to those of ordinary skill in the art of, for example, manufacturing of precision clocks, color cathode ray tubes (CRTs), and mechanical thermostats, either requiring, or involved with, the use of materials exhibiting specific mechanical and thermo-mechanical physicochemical properties, characteristics, and behavior, of high rigidity, high dimensional stability, low thermal (thermo-mechanical) expansion, and extremely low mechanical sensitivity to temperature changes, achieved by featuring a very low coefficient of thermal expansion (CTE).

INVAR is basically steel or stainless steel with 36% nickel, and other smaller amounts of other elements for added machinability and/or because a pure alloy is hard to obtain, and has a coefficient of thermal expansion (CTE) on the order of about $1.0 \times 10^{-6}/°$ K. Three common types of INVAR alloys are (1) INVAR 36, (2) FM (Free Machining) INVAR, which has about twice the carbon content of INVAR 36, includes selenium, more manganese alloyed in, and is more convenient to work with than INVAR 36, and (3) SUPER INVAR, which has some cobalt added, and has an extremely low coefficient of thermal expansion (CTE) on the order of about $0.6 \times 10^{-6}/°$ K.

A fourth, less known, type of INVAR, developed by NASA/JPL, is referred to as HP (High Purity) INVAR 36, including a low carbon content (less than about 0.01%), and which has an improved (lower) coefficient of thermal expansion (CTE) and dimensional stability over time, as described in the NASA Technical Support Package "Temporally and Thermally Stable Iron/Nickel Alloy", for the August 1995 issue of NASA Tech Briefs.

A preferred solid non-metallic type of material, used for making the optical interferometer mount, including above listed components (1)-(8) thereof, is selected from the group consisting of special quartzes, special glasses, special ceramics, and special glass ceramics, exhibiting the above described specific mechanical and thermo-mechanical physicochemical properties, characteristics, and behavior, of high rigidity, high dimensional stability, extremely low thermal (thermo-mechanical) expansion or expansibility, and extremely low mechanical sensitivity to temperature changes, achieved by featuring an extremely low coefficient of thermal expansion (CTE).

Implementation of the method and system for real time high speed high resolution hyper-spectral imaging of the present invention involves performing steps and sub-steps in a manner selected from the group consisting of manually, semi-automatically, fully automatically, and a combination thereof, and involves operation of components, mechanisms, and elements, in a manner selected from the group consisting of manual, semi-automatic, fully automatic, and a combination thereof. Moreover, according to actual steps and sub-steps, components, mechanisms, and elements, used for implementing a particular embodiment of the disclosed invention, steps and sub-steps are performed by using hardware, software, or an integrated combination thereof, and, components, mechanisms, and elements, operate by using hardware, software, or an integrated combination thereof.

In particular, software used for implementing the present invention features operatively connected and functioning written or printed data, in the form of software programs, software routines, software sub-routines, software symbolic languages, software code, software instructions or protocols, or a combination thereof. Hardware used for implementing the present invention features operatively connected and functioning electronic components and elements, in the form of a computer chip, an integrated circuit, an electronic circuit, an electronic sub-circuit, a hard-wired circuit, or a combination thereof, involving digital and/or analog operations. Accordingly, an integrated combination of (1) software and (2) hardware, used for implementing the present invention, features an integrated combination of (1) operatively connected and functioning written or printed data, in the form of software programs, software routines, software sub-routines, software symbolic languages, software code, software instructions or protocols, or a combination thereof, and (2) operatively connected and functioning electronic components and elements, in the form of a computer chip, an integrated circuit, an electronic circuit, an electronic sub-circuit, a hard-wired circuit, or a combination thereof, involving digital and/or analog operations.

BRIEF DESCRIPTION OF THE DRAWINGS

The present invention is herein described, by way of example only, with reference to the accompanying drawings. With specific reference now to the drawings in detail, it is stressed that the particulars shown are by way of example and for purposes of illustrative description of the preferred embodiments of the present invention only, and are presented in the cause of providing what is believed to be the most useful and readily understood description of the principles and conceptual aspects of the present invention. In this regard, no attempt is made to show structural details of the present invention in more detail than is necessary for a fundamental understanding of the invention, the description taken with the drawings making apparent to those skilled in the art how the several forms of the invention may be embodied in practice. In the drawings.

DESCRIPTION OF THE PREFERRED EMBODIMENTS

Figure 1A:
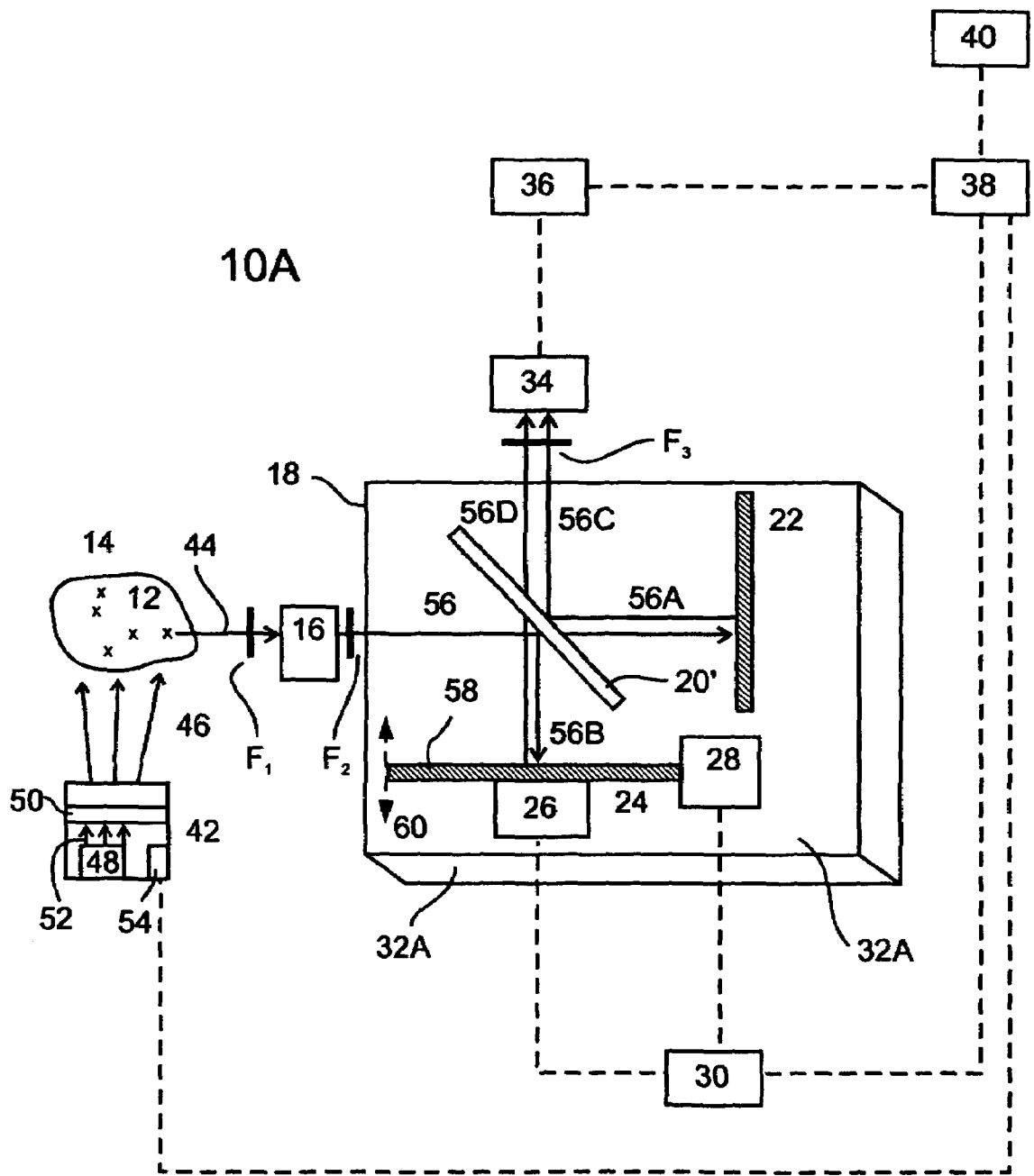
FIG. 1A is a schematic diagram illustrating a top view of the first alternative specific configuration 10A of the generalized preferred embodiment of the hyper-spectral imaging system, featuring a rectangular shaped beam splitter 20', implemented for real time high speed high resolution hyper-spectral imaging, in accordance with the present invention.

The present invention relates to a method and system for real time high speed high resolution hyper-spectral imaging. The present invention is based on using piezoelectric technology with closed loop control and analysis algorithms, for enabling real time high speed high resolution nanometer accuracy movement of a movable mirror in an optical interferometer, along with using a specially designed and constructed optical interferometer mount as part of the optical interferometer, for achieving high thermo-mechanical stability of mounted optical interferometer components during the real time hyper-spectral imaging.

The present invention features several aspects of novelty and inventiveness which are based on integration of a specially designed, constructed, and operative, optical interferometer in the hyper-spectral imaging system. The optical interferometer features real time high speed high resolution nanometer accuracy displacement or movement of the movable mirror, enabled by operative connections and combined operation of a piezoelectric motor, a distance change feedback sensor, a piezoelectric motor controller, the specially designed and constructed thermo-mechanically stable optical interferometer mount, and the closed loop control and analysis algorithms.

The optical interferometer also features high thermo-mechanical stability, achieved by the thermo-mechanically stable optical interferometer mount, exhibiting extremely low mechanical sensitivity to temperature changes, functioning as a mount for optical interferometer components, in particular, a beam splitter, a fixed mirror, and the movable mirror, used for determining and changing the optical path distance (OPD) of a divided collimated object emission beam.

The optical interferometer mount exhibits specific mechanical and thermo-mechanical physicochemical properties, characteristics, and behavior, of high rigidity, high dimensional stability, extremely low thermal (thermo-mechanical) expansion or expansibility, and extremely low mechanical sensitivity to temperature changes, achieved by having an extremely low coefficient of thermal expansion (CTE), in particular, less than about $1.0 \times 10^{-4}/°$ K, preferably, less than about $1.0 \times 10^{-5}/°$ K, and more preferably, on the order of about $1.0 \times 10^{-6}/°$ K. An extremely low coefficient of thermal expansion is especially needed in order to reduce dependency of the optical path difference (OPD) of the divided collimated object emission beam, and changes thereof, on changes (increases or decreases) in temperature.

The hyper-spectral imaging method and system feature a specially designed and implemented optical path distance (OPD) calibration, and image processing software algorithms, for enabling high speed (on the order of 50 milliseconds) generating of high spatial resolution and high spectral resolution interferogram images used for synthesizing and analyzing high resolution highly reproducible three-dimensional hyper-spectral (cube) images.

Different alternative specific configurations of the generalized preferred embodiment of the hyper-spectral imaging system, according to the specific geometrical shape of the beam splitter, according to the specific positions of the fixed mirror and the movable mirror relative to the beam splitter, and according to the corresponding specific configuration of the optical interferometer mount and optical interferometer components mounted thereon, in the optical interferometer, are each applicable for implementing the method of the present invention.

Based upon the above indicated aspects of novelty and inventiveness, the present invention successfully overcomes significant limitations, and widens the scope, of presently known techniques of hyper-spectral imaging, and is commercially applicable in a wide variety of different fields.

It is to be understood that the present invention is not limited in its application to the details of the order or sequence, and number, of steps and sub-steps of operation or implementation of the method, or to the details of type, composition, construction, arrangement, and order, and number, of the components and elements of the system, set forth in the following description and accompanying drawings. For example, as previously stated hereinabove, and illustratively described hereinbelow, different alternative specific configurations of the generalized preferred embodiment of the hyper-spectral imaging system, according to the specific geometrical shape of a beam splitter, according to the specific positions of a fixed mirror and the movable mirror relative to the beam splitter, and according to the corresponding specific configuration of the optical interferometer mount and optical interferometer components mounted thereon, in the optical interferometer, are each applicable for implementing the method of the present invention. Accordingly, the present invention is capable of other embodiments or of being practiced or carried out in various ways. Although steps and components similar or equivalent to those described herein can be used for practicing or testing the present invention, suitable steps and components are described herein.

It is also to be understood that unless otherwise defined, all technical and scientific words, terms, and/or phrases, used herein have either the identical or similar meaning as commonly understood by one of ordinary skill in the art to which this invention belongs. Phraseology, terminology, and, notation, employed herein are for the purpose of description and should not be regarded as limiting. For example, the following description refers to use of an optical interferometer as being synonymous with using a scanning optical path difference (OPD) generator, a Fourier transform spectrometer, or a Michelson type interferometer, each having a movable mirror, in order to illustrate implementation of the present invention. Additionally, as used herein, the term "about" refers to ±10% of the associated value.

Components, steps, operation, and implementation of a method and system for real time high speed and resolution hyper-band spectral imaging, according to the present invention, are better understood with reference to the following description and accompanying drawings. Throughout the following description and accompanying drawings, like reference numbers refer to like elements.

In the following description of the method and system of the present invention, included are main or principal steps and sub-steps, and main or principal devices, mechanisms, components, and elements, needed for sufficiently understanding proper 'enabling' utilization and implementation of the disclosed method and system. Accordingly, description of various possible required and/or optional preliminary, intermediate, minor, steps, sub-steps, devices, mechanisms, components, and/or elements, which are readily known by one of ordinary skill in the art, and/or which are available in the prior art and technical literature relating to spectral imaging, in general, and hyper-spectral imaging, in particular, are at most only briefly indicated herein.

With reference to the drawings, in the present invention, each of the four different alternative specific configurations, referenced in FIGS. 1A, 1B, 1C, and 1D, by 10A, 10B, 10C, and 10D, respectively, of the generalized preferred embodiment of the hyper-spectral imaging system, herein, generally referred to in the text as hyper-spectral imaging system 10, is applicable for implementing the method of the present invention. Each specific configuration of the generalized hyper-spectral imaging system 10 is implemented for real time high speed high resolution generating, collecting, processing, and analyzing, hyper-spectral images of one or more objects, herein, generally referred to as object or objects 12, in a scene or sample 14. Each object 12 either inherently emits electromagnetic radiation in the form of an emission spectrum, or is affected in a way, such as excitation by incident electromagnetic radiation, supplied by an external source of the electromagnetic radiation, causing each object 12 to emit electromagnetic radiation in the form of an emission spectrum.

Each of the four alternative specific configurations 10A, 10B, 10C, and 10D, illustrated in FIGS. 1A, 1B, 1C, and 1D, respectively, of the generalized preferred embodiment of the hyper-spectral imaging system 10, of the present invention, features the following primary components: (a) an electromagnetic radiation collimating element, herein, generally referred to as collimator 16; (b) an optical interferometer 18, which includes: (i) a beam splitter (in particular, rectangular shaped beam splitter 20' in optical interferometer 18 of each alternative specific configuration 10A and 10B, or cubic shaped beam splitter 20" in optical interferometer 18 of each alternative specific configuration 10C and 10D), herein, generally referred to in the text as beam splitter 20, (ii) a fixed mirror 22, (iii) a movable mirror 24, (iv) a piezoelectric motor 26, (v) a distance change feedback sensor 28, (vi) a piezoelectric motor controller 30, and (vii) an optical interferometer mount (in particular, exemplary specific configuration 32A, 32B, 32C, or 32D, in each corresponding alternative specific configuration 10A, 10B, 10C, and 10D, respectively), herein, generally referred to in the text as optical interferometer mount 32; (c) camera or focusing optics, herein, generally referred to as camera optics 34; (d) a detector 36; and (e) a central programming and control/data/information signal processing unit (CPPU) 38.

Each of the four alternative specific configurations 10A, 10B, 10C, and 10D, of the generalized preferred embodiment of the hyper-spectral imaging system 10 optionally, further includes: (f) a display device 40; (g) an illumination mechanism 42; and (h) at least one electromagnetic radiation filter $F_1$, $F_2$, and/or $F_3$. Electrical and/or electronic communications between selected components of hyper-spectral imaging system 10 and CPPU 38 are indicated in each of FIGS. 1A-1D, by control/data links, shown as dashed lines connecting the selected components with CPPU 38.

The four alternative specific configurations 10A, 10B, 10C, and 10D, illustrated in FIGS. 1A, 1B, 1C, and 1D, respectively, of the generalized preferred embodiment of the hyper-spectral imaging system 10, differ from one another according to the specific geometrical shape (rectangular or cubic) of the beam splitter 20, according to the specific positions of fixed mirror 22 and movable mirror 24 relative to the beam splitter 20, and according to the corresponding specific configuration 32A, 32B, 32C, and 32D, respectively, of the optical interferometer mount 32 and optical interferometer components mounted thereon, in optical interferometer 18.

Figure 1B:
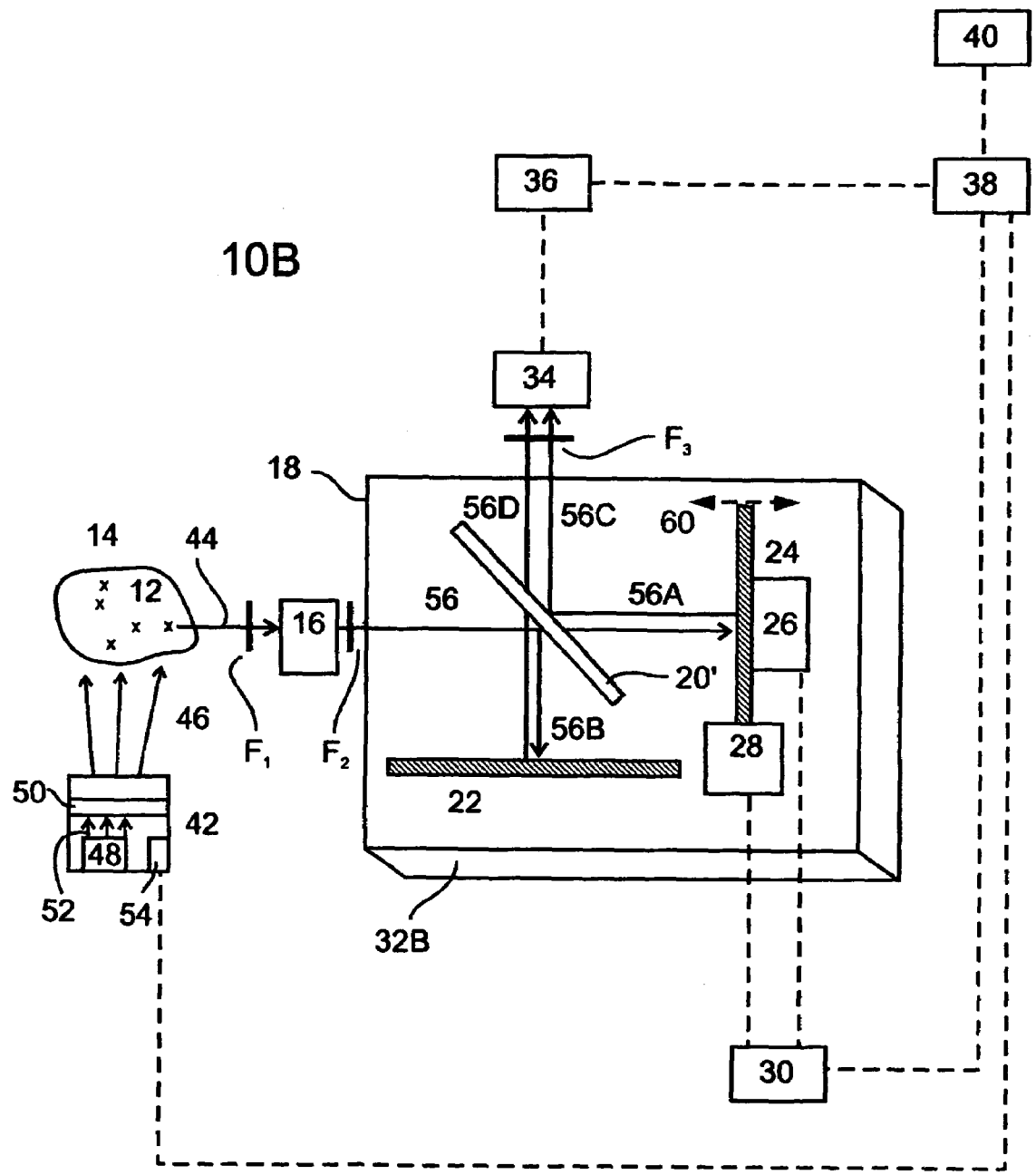
FIG. 1B is a schematic diagram illustrating a top view of the second alternative specific configuration 10B of the generalized preferred embodiment of the hyper-spectral imaging system, featuring a rectangular shaped beam splitter 20', implemented for real time high speed high resolution hyper-spectral imaging, in accordance with the present invention.

In each of the first and second alternative specific configurations 10A and 10B, respectively, illustrated in FIGS. 1A and 1B, respectively, of the generalized preferred embodiment of the hyper-spectral imaging system 10, optical interferometer 18 features a rectangular shaped beam splitter 20'. The first and second alternative specific configurations, 10A and 10B, respectively, of the generalized preferred embodiment of the hyper-spectral imaging system 10, differ from one another, whereby in optical interferometer 18, the locations of (ii) fixed mirror 22 and (iii) movable mirror 24, along with the associated (iv) piezoelectric motor 26, (v) distance change feedback sensor 28, and (vi) piezoelectric motor controller 30, are switched relative to rectangular shaped beam splitter 20'.

Figure 1C:
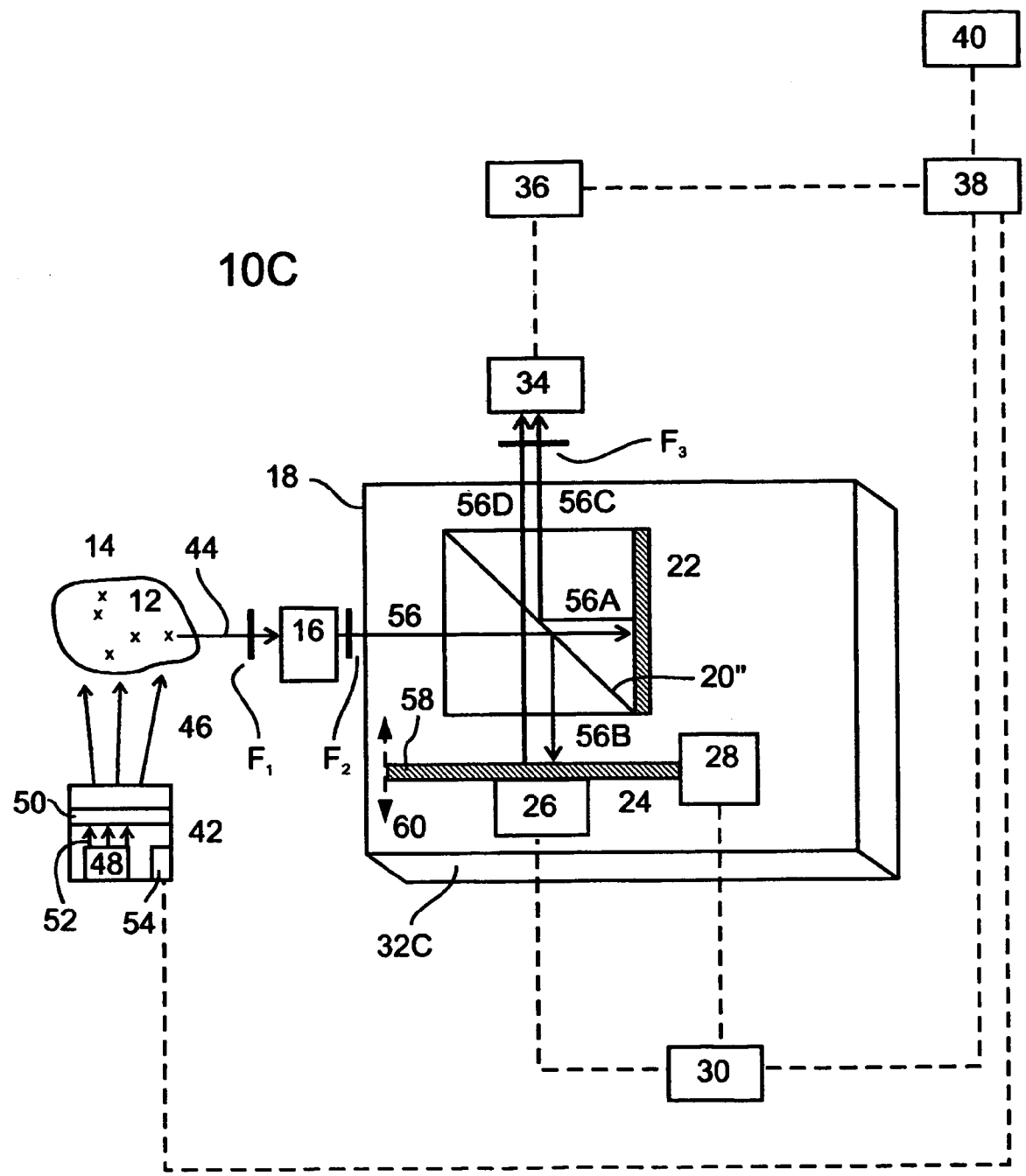
FIG. 1C is a schematic diagram illustrating a top view of the third alternative specific configuration 10C of the generalized preferred embodiment of the hyper-spectral imaging system, featuring a cubic shaped beam splitter 20", implemented for real time high speed high resolution hyper-spectral imaging, in accordance with the present invention.
Figure 1D:
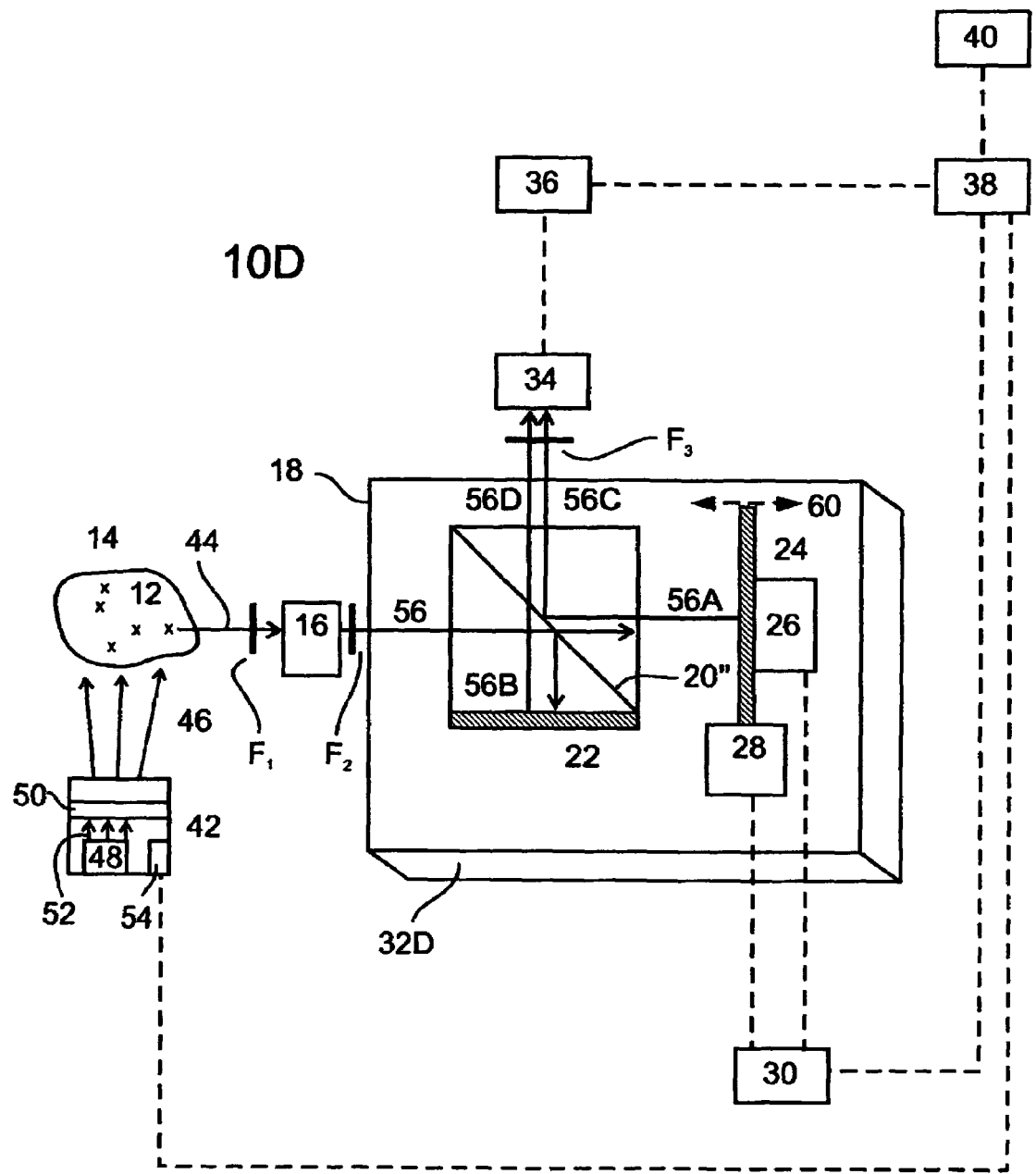
FIG. 1D is a schematic diagram illustrating a top view of the fourth alternative specific configuration 10D of the generalized preferred embodiment of the hyper-spectral imaging system, featuring a cubic shaped beam splitter 20", implemented for real time high speed high resolution hyper-spectral imaging, in accordance with the present invention.

In each of the third and fourth alternative specific configurations 10C and 10D, respectively, illustrated in FIGS. 1C and 1D, respectively, of the generalized preferred embodiment of the hyper-spectral imaging system 10, optical interferometer 18 features a cubic shaped beam splitter 20". The third and fourth alternative specific configurations, 10C and 10D, respectively, of the generalized preferred embodiment of the hyper-spectral imaging system 10, differ from one another, whereby in optical interferometer 18, the locations of (ii) fixed mirror 22 and (iii) movable mirror 24, along with the associated (iv) piezoelectric motor 26, (v) distance change feedback sensor 28, and (vi) piezoelectric motor controller 30, are switched relative to cubic shaped beam splitter 20".

As previously stated hereinabove, and as illustratively described hereinbelow, the method of the present invention, featuring Steps (a)-(f), and optionally, additional Steps (g)-(k), is implemented in the same manner for each of the four alternative specific configurations 10A, 10B, 10C, and 10D, illustrated in FIGS. 1A, 1B, 1C, and 1D, respectively, of the generalized preferred embodiment of the hyper-spectral imaging system of the present invention.

In Step (a) of the method of the present invention, there is emitting electromagnetic radiation in a form of an object emission beam, by objects in a scene or a sample, and collimating the object emission beam, for forming a collimated object emission beam.

Referring to FIGS. 1A-1D, objects 12 in scene or sample 14, emit electromagnetic radiation in the form of an object emission beam 44, characterized by an emission spectrum. Preferably, objects 12 in scene or sample 14 inherently emit electromagnetic radiation, in the form of an object emission beam 44, as a result of inherent (body) thermal heat emitted by objects 12. Alternatively, objects 12 in scene or sample 14 emit electromagnetic radiation 44 as a result of excitation by incident electromagnetic radiation 46, for example, ultraviolet radiation or light, supplied by an external source, for example, optional illumination mechanism 42, radiating electromagnetic radiation 46, upon objects 12, causing objects 12 to emit electromagnetic radiation in the form of an object emission beam 44.

Optional illumination mechanism 42 preferably includes (i) a light source 48, (ii) a light collimating element 50, such as a collimating lens for collimating light 52 exiting light source 48 in the direction of objects 12 in scene or sample 14, (iii) a local illumination mechanism control unit 54 in electronic communication with CPPU 38, and appropriate control/data links. Preferably, light source 48 generates light 52 having a complete spectrum. Preferably, electromagnetic radiation 46 exiting illumination mechanism 42 passes through at least one expansion lens (not shown) functioning to expand the beam of exiting electromagnetic radiation 46.

Electromagnetic radiation 46, in the form of light, supplied by illumination mechanism 42, for illuminating objects 12 in scene or sample 14, is selected from the group consisting of polychromatic light, monochromatic light, poly- or multi-monochromatic light, and, combinations thereof. An exemplary polychromatic light is white light. An exemplary monochromatic light is selected from the group consisting of visible spectrum monochromatic light, such as red light, blue light, or green light, and, invisible spectrum monochromatic light, such as ultra-violet light or infrared light. An exemplary poly- or multi-chromatic light is a combination of a plurality of at least two different previously listed exemplary monochromatic lights. Illumination mechanism 40 is controlled by a local illumination mechanism control unit 54 in electronic communication with CPPU 38.

A collimator 16 collimates the electromagnetic radiation of object emission beam 44, emitted by objects 12 in scene or sample 14, for forming collimated object emission beam 56. For properly collimating object emission beam 44, the focal length of collimator 16 is equal to the distance between collimator 16 and objects 12. Optionally, an electromagnetic radiation filter, $F_1$ or $F_2$, for filtering out multiple harmonics of object emission beam 44, as is well known in the art, is placed either before or after, respectively, collimator 16, as shown in FIGS. 1A-1D.

In Step (b), there is receiving and dividing the collimated object emission beam by an optical interferometer, for generating an interference image.

By implementing each of the four alternative specific configurations 10A, 10B, 10C, and 10D, illustrated in FIGS. 1A, 1B, 1C, and 1D, respectively, of the generalized preferred embodiment of the hyper-spectral imaging system 10 of the present invention, optical interferometer 18 receives collimated object emission beam 56. Optical interferometer 18 is a type of optical interferometer, generating interference patterns or images, selected from the group consisting of a scanning optical path difference (OPD) generator, a Fourier transform spectrometer, and, a Michelson interferometer, each having a movable mirror, such as movable mirror 24, as shown in FIGS. 1A-1D.

In each of the first and second alternative specific configurations, 10A and 10B, respectively, illustrated in FIGS. 1A and 1B, respectively, of the generalized preferred embodiment of the hyper-spectral imaging system 10, optical interferometer 18 includes: (i) rectangular beam splitter 20', (ii) fixed mirror 22, (iii) movable mirror 24, (iv) piezoelectric motor 26, (v) distance change feedback sensor 28, (vi) piezoelectric motor controller 30, and (vii) optical interferometer mount 32A. Fixed mirror 22 and movable mirror 24 are located at a right angle to each other, and each mirror is oriented at a pre-determined angle, preferably, a 45° angle, relative to the beam splitting surface of rectangular beam splitter 20' positioned at the vertex of the right angle between the two mirrors. Preferably, the reflective surface of fixed mirror 22 and of movable mirror 24 is of a flat shape.

With reference to the first alternative specific configuration 10A, illustrated in FIG. 1A, collimated object emission beam 56 incident on rectangular beam splitter 20' is divided into two beams, beam 56a and beam 56b. Beam 56a corresponds to collimated object emission beam 56 which passes through rectangular beam splitter 20' and onto fixed mirror 22, while beam 56b corresponds to collimated object emission beam 56 which reflects off rectangular beam splitter 20' and onto movable mirror 24. Beam 56a reflects off fixed mirror 22, onto and off rectangular beam splitter 20', forming first exiting beam 56c. Beam 56b reflects off rectangular beam splitter 20', onto and off movable mirror 24, which passes through rectangular beam splitter 20', forming second exiting beam 56d. First exiting beam 56c and second exiting beam 56d together exit out of optical interferometer 18 and enter camera optics 34.

Reflective surface 58 of movable mirror 24 is perpendicular to an axis 60 which is parallel to the optical path along which beam 56b travels and parallel to the optical path along which the divided beams, first exiting beam 56c and second exiting beam 56d, together exit optical interferometer 18. For each location or position of reflective surface 58 of movable mirror 24 along axis 60, parallel to divided beams, first exiting beam 56c and second exiting beam 56d, an interference pattern or image is generated as the two phase-shifted exiting beams, first exiting beam 56c and second exiting beam 56d, interfere with each other.

With reference to the second alternative specific configuration 10B, illustrated in FIG. 1B, of the generalized preferred embodiment of the hyper-spectral imaging system 10, in optical interferometer 18, the locations of (ii) fixed mirror 22 and (iii) movable mirror 24, along with associated (iv) piezoelectric motor 26, (v) distance change feedback sensor 28, and (vi) piezoelectric motor controller 30, are switched, relative to rectangular beam splitter 20', compared to these component locations in optical interferometer 18 of the first alternative specific configuration 10A, illustrated in FIG. 1A.

Collimated object emission beam 56 incident on rectangular beam splitter 20' is divided into two beams, beam 56a and beam 56b. Beam 56a corresponds to collimated object emission beam 56 which passes through rectangular beam splitter 20' and onto movable mirror 24 (instead of onto fixed mirror 22 as in the first alternative specific configuration 10A, illustrated in FIG. 1A), while beam 56b corresponds to collimated object emission beam 56 which reflects off rectangular beam splitter 20' and onto fixed mirror 22 (instead of onto movable mirror 24 as in the first alternative specific configuration 10A). Beam 56a reflects off movable mirror 24, onto and off rectangular beam splitter 20', forming first exiting beam 56c. Beam 56b reflects off rectangular beam splitter 20', onto and off fixed mirror 22, which passes through rectangular beam splitter 20', forming second exiting beam 56d. First exiting beam 56c and second exiting beam 56d together exit out of optical interferometer 18 and enter camera optics 34.

Reflective surface 58 of movable mirror 24 is perpendicular to axis 60 which is parallel to the optical path along which collimated object emission beam 56 and beam 56a travel. For each location or position of reflective surface 58 of movable mirror 24 along axis 60, parallel to collimated object emission beam 56 and beam 56a, an interference pattern or image is generated as the two phase-shifted exiting beams, first exiting beam 56c and second exiting beam 56d, interfere with each other.

In each of the third and fourth alternative specific configurations, 10C and 10D, respectively, illustrated in FIGS. 1C and 1D, respectively, of the generalized preferred embodiment of the hyper-spectral imaging system 10, optical interferometer 18 includes: (i) cubic beam splitter 20", (ii) fixed mirror 22, (iii) movable mirror 24, (iv) piezoelectric motor 26, (v) distance change feedback sensor 28, (vi) piezoelectric motor controller 30, and (vii) optical interferometer mount 32A. Fixed mirror 22 and movable mirror 24 are located at a right angle to each other, and each mirror is oriented at a pre-determined angle, preferably, a 45° angle, relative to the beam splitting surface of cubic beam splitter 20" positioned at the vertex of the right angle between the two mirrors. Preferably, the reflective surface of fixed mirror 22 and of movable mirror 24 is of a flat shape.

Cubic shaped beam splitters are well known in the art. In a cubic shaped beam splitter, such as cubic beam splitter 20" used in the present invention, the beam splitting surface is located along the surface of one of the two main diagonals inside the cube. In each of the third and fourth alternative specific configurations, 10C and 10D, respectively, fixed mirror 22 is formed along an appropriate external edge of cubic beam splitter 20", whereby fixed mirror 22 and movable mirror 24 are located at a right angle to each other, and each mirror is oriented at a 45° angle relative to the beam splitting surface of cubic beam splitter 20". Using a cubic beam splitter according to this specific configuration results in a more accurate optical interferometer 18 in hyper-spectral imaging system 10, because fixed mirror 22 and cubic beam splitter 20" are structured in the form of a single fixed solid component in optical interferometer 18. Fixed mirror 22 is formed along the appropriate external edge of cubic beam splitter 20" by using one of several well known methods in the art, including, but not limited to, blowing an appropriate metal coating, and sticking a reflective surface, onto the appropriate external edge of cubic beam splitter 20".

With reference to the third alternative specific configuration 10C, illustrated in FIG. 1C, collimated object emission beam 56 incident on cubic beam splitter 20" is divided into two beams, beam 56a and beam 56b. Beam 56a corresponds to collimated object emission beam 56 which passes through cubic beam splitter 20" and onto fixed mirror 22, while beam 56b corresponds to collimated object emission beam 56 which reflects off cubic beam splitter 20" and onto movable mirror 24. Beam 56a reflects off fixed mirror 22, onto and off cubic beam splitter 20", forming first exiting beam 56c. Beam 56b reflects off cubic beam splitter 20", onto and off movable mirror 24, which passes through cubic beam splitter 20", forming second exiting beam 56d. First exiting beam 56c and second exiting beam 56d together exit out of optical interferometer 18 and enter camera optics 34.

Reflective surface 58 of movable mirror 24 is perpendicular to axis 60 which is parallel to the optical path along which beam 56b travels and parallel to the optical path along which the divided beams, first exiting beam 56c and second exiting beam 56d, together exit optical interferometer 18. For each location or position of reflective surface 58 of movable mirror 24 along axis 60, parallel to divided beams, first exiting beam 56c and second exiting beam 56d, an interference pattern or image is generated as the two phase-shifted exiting beams, first exiting beam 56c and second exiting beam 56d, interfere with each other.

With reference to the fourth alternative specific configuration 10D, illustrated in FIG. 1D, of the generalized preferred embodiment of the hyper-spectral imaging system 10, in optical interferometer 18, the locations of (ii) fixed mirror 22 and (iii) movable mirror 24, along with associated (iv) piezoelectric motor 26, (v) distance change feedback sensor 28, and (vi) piezoelectric motor controller 30, are switched, relative to cubic beam splitter 20", compared to these component locations in optical interferometer 18 of the third alternative specific configuration 10C, illustrated in FIG. 1C.

Collimated object emission beam 56 incident on cubic beam splitter 20" is divided into two beams, beam 56a and beam 56b. Beam 56a corresponds to collimated object emission beam 56 which passes through cubic beam splitter 20" and onto movable mirror 24 (instead of onto fixed mirror 22 as in the third alternative specific configuration 10C, illustrated in FIG. 1C), while beam 56b corresponds to collimated object emission beam 56 which reflects off cubic beam splitter 20" and onto fixed mirror 22 (instead of onto movable mirror 24 as in the third alternative specific configuration 10C). Beam 56a reflects off movable mirror 24, onto and off cubic beam splitter 20", forming first exiting beam 56c. Beam 56b reflects off cubic beam splitter 20", onto and off fixed mirror 22, which passes through cubic beam splitter 20", forming second exiting beam 56d. First exiting beam 56c and second exiting beam 56d together exit out of optical interferometer 18 and enter camera optics 34.

Reflective surface 58 of movable mirror 24 is perpendicular to axis 60 which is parallel to the optical path along which collimated object emission beam 56 and beam 56a travel. For each location or position of reflective surface 58 of movable mirror 24 along axis 60, parallel to collimated object emission beam 56 and beam 56a, an interference pattern or image is generated as the two phase-shifted exiting beams, first exiting beam 56c and second exiting beam 56d, interfere with each other.

In each of the four alternative specific configurations 10A, 10B, 10C, and 10D, illustrated in FIGS. 1A, 1B, 1C, and 1D, respectively, of the generalized preferred embodiment of the hyper-spectral imaging system 10 of the present invention, as described hereinbelow, each generated interference pattern or image is focused by camera optics, such as camera optics 34, which is recorded by a detector, such as detector 36. A plurality of recorded interference images are processed by an image processing unit, such as central programming and control/data/information signal processing unit (CPPU) 38, for forming an interferogram. A plurality of interferograms are then processed by central programming and control/data/information signal processing unit (CPPU) 38, for forming a three-dimensional hyper-spectral (cube) image. Three-dimensional hyper-spectral (cube) images are subjected to a variety of different analysis and processing procedures, for example, involving pattern recognition and classification analysis, for extracting and classifying meaningful information and data which can be used for a particular application.

In Step (c), there is piezoelectrically determining and changing the magnitude of the optical path difference (OPD) of the divided collimated object emission beam, for generating at least one interference image for each magnitude of the optical path difference (OPD).

By implementing each of the four alternative specific configurations 10A, 10B, 10C, and 10D, illustrated in FIGS. 1A, 1B, 1C, and 1D, respectively, of the generalized preferred embodiment of the hyper-spectral imaging system 10 of the present invention, the magnitude of the optical path difference (OPD) of the divided collimated object emission beam 56 is defined as, and determined by, the difference in the lengths of the optical paths traveled by the divided beams, first exiting beam 56c and second exiting beam 56d, which together exit optical interferometer 18 and enter camera optics 34. The magnitude of the optical path difference (OPD) of the divided collimated object emission beam 56 is piezoelectrically determined and changed according to the position or location and positioning of reflective surface 58 of movable mirror 24 along axis 60. Accordingly, the magnitude of the optical path difference (OPD) of the divided collimated object emission beam 56 is piezoelectrically changed by piezoelectrically changing the location or position of reflective surface 58 of movable mirror 24 along axis 60, which is done by piezoelectrically controlling movement of movable mirror 24 along axis 60.

As is well known in the art, the magnitude of the optical path difference (OPD), and the change in the magnitude of the optical path difference (OPD) of the divided collimated object emission beam 56, are each a function of the type of the electromagnetic radiation of object emission beam 44 emitted by objects 12 in scene or sample 14. By implementing the present invention, the typical 'maximum' magnitude of the optical path difference (OPD) of the divided collimated object emission beam 56 is on the order of 10 wavelengths, for obtaining high resolution hyper-spectral images. This is in strong contrast to prior art techniques of using an optical interferometer for hyper-spectral imaging, whereby a typical maximum magnitude of the optical path difference (OPD) on the order of 40 wavelengths is required for obtaining high resolution hyper-spectral images. The smaller maximum magnitude of the optical path difference (OPD) required by the present invention is advantageous over prior art due to the fact that decreasing the magnitude of the optical path difference (OPD) increases positioning accuracy and scanning rate of movable mirror 24 in optical interferometer 18. In the present invention, the maximum magnitude of the optical path difference (OPD) of the divided collimated object emission beam 56 is obtained by a mathematical calculation, described below in Step (g).

In optical interferometer 18, piezoelectric motor 26 is operatively connected to movable mirror 24 and operatively connected, via control/data links, to piezoelectric motor controller 30, and functions by highly accurately and highly reproducibly displacing or moving movable mirror 24 along axis 60. Alternatively, piezoelectric motor 26 is operatively connected to a mechanical element, component, or device, such as a three-dimensional movable platform known in the art, and functions by driving the mechanical element, component, or device, which subsequently displaces or moves movable mirror 24 along axis 60. An important advantage of using piezoelectric motor 26 is for highly accurately and highly reproducibly displacing or moving movable mirror 24 with nanometer movement resolution. The extent of piezoelectrically changing the magnitude of the optical path difference (OPD) of the divided collimated object emission beam 56 along axis 60, is in the range of from about zero wavelengths to about ten wavelengths.

Distance change feedback sensor 28 is operatively connected to movable mirror 24 and operatively connected, via control/data links, to piezoelectric motor controller 30, and functions by highly accurately and highly reproducibly sensing and measuring the change in distance or position of movable mirror 24 along axis 60. In general, distance change feedback sensor 28 is any appropriate accurate and reproducible distance or position change sensor, for sensing and measuring the change in distance or position of movable mirror 24 along axis 60. Preferably, distance change feedback sensor 28 is a capacitor sensor. A capacitor sensor is capable of highly accurately and highly reproducibly sensing and measuring changes in distance or position of a relatively small object, such as movable mirror 24, with nanometer resolution. As a result, the operative combination of piezoelectric motor 26 and distance change feedback sensor 28 in the form of a capacitor sensor enables piezoelectric motor 26 to highly accurately and highly reproducibly move movable mirror 24 with nanometer resolution, which is required for the image processing applied to the interferograms of the present invention.

Distance change feedback sensor 28, in the form of a capacitor sensor, is a capacitor having two plates, and is configured in such a way that the first plate of the capacitor is connected to movable mirror 24, and the second plate of the capacitor is connected to a specially designed and constructed optical interferometer mount 32 (herein, specifically referred to and indicated as exemplary corresponding specific configuration 32A, 32B, 32C, and 32D, of the optical interferometer mount 32, in optical interferometer 18 of the first, second, third, and fourth, alternative specific configuration 10A, 10B, 10C, and 10D, respectively, illustrated in FIGS. 1A, 1B, 1C, and 1D, respectively, of the generalized preferred embodiment of the hyper-spectral imaging system) of optical interferometer 18, illustratively described hereinbelow. When the distance or position of movable mirror 24 along axis 60 changes, via actuation and operation of piezoelectric motor 26, the distance between the two plates of the capacitor of distance change feedback sensor 28 changes, causing a change in capacity concurrent with a change in the potential difference existing between the two capacitor plates. The potential difference existing between the two capacitor plates of distance change feedback sensor 28 is measured by piezoelectric motor controller 30.

Piezoelectric motor controller 30 is operatively connected, via control/data links, to piezoelectric motor 26, and operatively connected, via control/data links, to distance change feedback sensor 28, and operatively connected, via control/data links, to central programming and control/data/information signal processing unit (CPPU) 38. Piezoelectric motor controller 30 functions by highly accurately and highly reproducibly actuating and controlling piezoelectric motor 26, according to previously described measurement of the potential difference existing between the two capacitor plates of distance change feedback sensor 28, and according to the required change in distance or position of movable mirror 24 along axis 60 received, via the control/data links, by piezoelectric motor controller 30 in the form of a command sent by central programming and control/data/information signal processing unit (CPPU) 38, as described hereinbelow.

Accordingly, piezoelectric motor controller 30 operates as a closed loop controller of the change in distance or position of movable mirror 24 along axis 60. The relationship between the measurement of the potential difference existing between the two capacitor plates of distance change feedback sensor 28 and the optical path difference (OPD) of the divided collimated object emission beam 56, for actuating a required change in distance or position of movable mirror 24 along axis 60, is used for implementing the present invention. A special calibration procedure, described hereinbelow, as part of Step (c), is used for measuring and generating calibration values of this relationship, which are stored in a data/information look up table, herein, referred to as a piezo-look-up-table (PLUT).

Piezoelectric motor controller 30 measures the potential difference existing between the two capacitor plates of distance change feedback sensor 28, by measuring the distance between the two capacitor plates of distance change feedback sensor 28, by applying AC voltage or current, depending on the particular implementation. Preferably, piezoelectric motor controller 30 measures the distance between the two capacitor plates of distance change feedback sensor 28 by applying AC voltage generated by a highly stable sinusoidal signal generator stabilized by an amplitude stabilizer, and measuring the potential difference and the frequency emerging from the capacitor, which is a function of the distance between the two capacitor plates of the capacitor sensor.

As stated above, distance change feedback sensor 28, in the form of a capacitor sensor, is a capacitor having two plates, and is configured in such a way that the first plate of the capacitor is connected to movable mirror 24, and the second plate of the capacitor is connected to a specially designed and constructed optical interferometer mount 32 of optical interferometer 18. As illustratively described herein, the four alternative specific configurations, 10A, 10B, 10C, and 10D, illustrated in FIGS. 1A, 1B, 1C, and 1D, respectively, of the generalized preferred embodiment of the hyper-spectral imaging system 10, differ from one another according to the specific geometrical shape of the beam splitter 20 (in particular, rectangular shaped beam splitter 20' in optical interferometer 18 of each alternative specific configuration 10A and 10B, or cubic shaped beam splitter 20" in optical interferometer 18 of each alternative specific configuration 10C and 10D), according to the specific positions of fixed mirror 22 and movable mirror 24 relative to the beam splitter 20, and according to the corresponding specific configuration 32A, 32B, 32C, and 32D, respectively, of the optical interferometer mount 32 and optical interferometer components mounted thereon, in optical interferometer 18.

FIGS. 2A, 2B, 2C, and 2D, are each a schematic diagram illustrating a perspective view of an exemplary corresponding specific configuration 32A, 32B, 32C, and 32D, respectively, of the optical interferometer mount 32 used as a thermo-mechanically stable mount for components of optical interferometer 18 in the first, second, third, and fourth, alternative specific configuration 10A, 10B, 10C, and 10D, respectively, illustrated in FIGS. 1A, 1B, 1C, and 1D, respectively, of the generalized preferred embodiment of the hyper-spectral imaging system of the present invention.

Figure 2A:
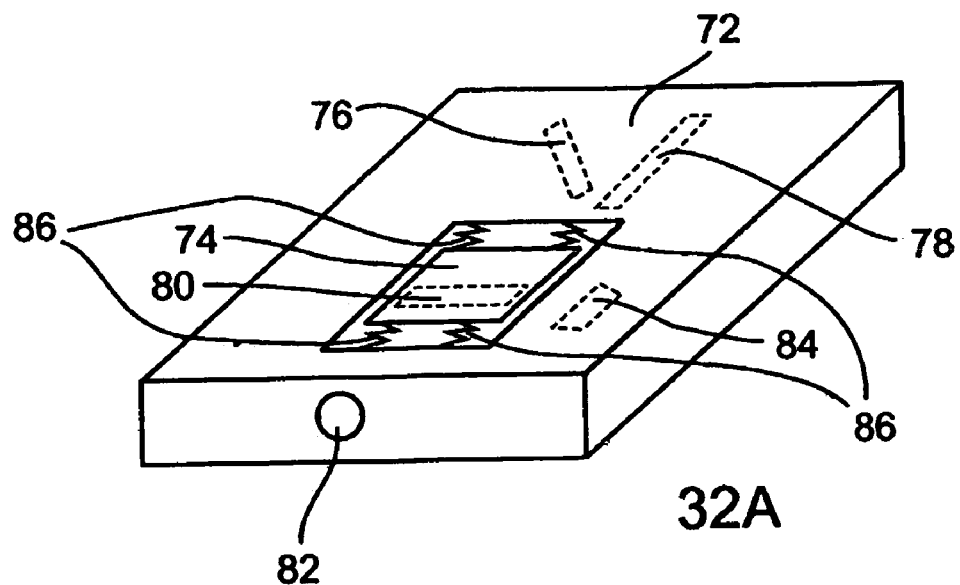
FIG. 2A is a schematic diagram illustrating a perspective view of an exemplary corresponding specific configuration 32A of the optical interferometer mount used as a thermo-mechanically stable mount for components of the optical interferometer 18 of the first alternative specific configuration 10A of the generalized preferred embodiment of the hyper-spectral imaging system illustrated in FIG. 1A, in accordance with the present invention.
Figure 2B:
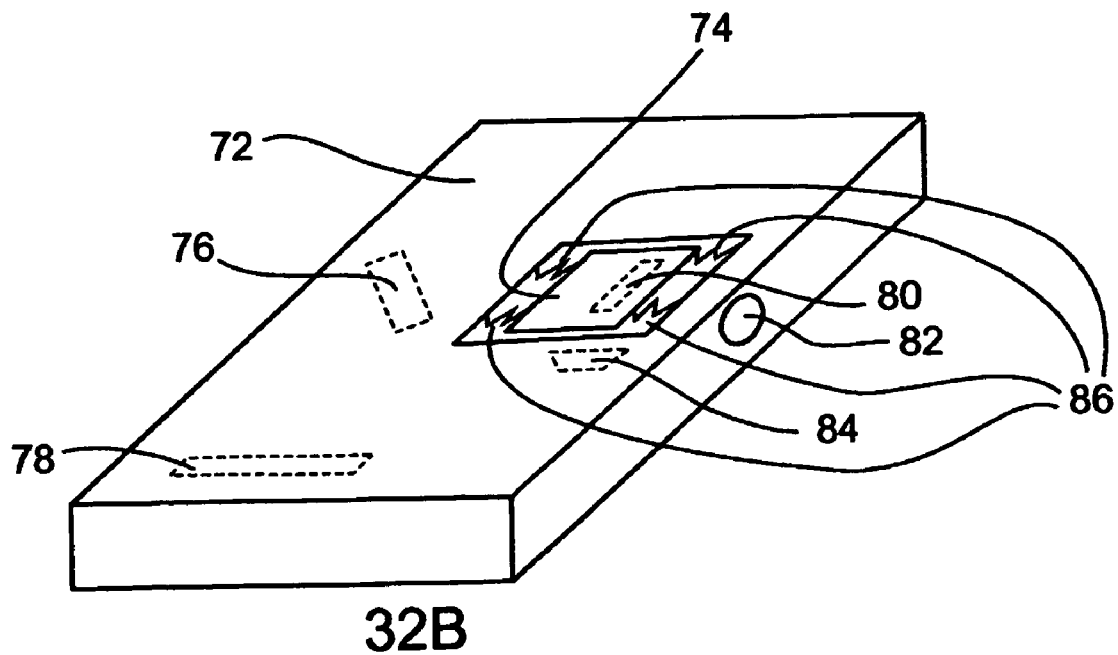
FIG. 2B is a schematic diagram illustrating a perspective view of an exemplary corresponding specific configuration 32B of the optical interferometer mount used as a thermo-mechanically stable mount for components of the optical interferometer 18 of the second alternative specific configuration 10B of the generalized preferred embodiment of the hyper-spectral imaging system illustrated in FIG. 1B, in accordance with the present invention.

For each of the first and second alternative specific configurations 10A and 10B, respectively, illustrated in FIGS. 1A and 1B, respectively, of the generalized preferred embodiment of the hyper-spectral imaging system 10, wherein optical interferometer 18 features rectangular shaped beam splitter 20', each exemplary corresponding specific configuration 32A and 32B, respectively, illustrated in further detail in FIGS. 2A and 2B, respectively, of the optical interferometer mount 32 features the following primary components: (1) a fixed mount section 72, (2) a movable mount section 74, (3) a mounting location 76 of rectangular beam splitter 20' on fixed mount section 72, (4) a mounting location 78 of fixed mirror 22 on fixed mount section 72, (5) a mounting location 80 of movable mirror 24 on movable mount section 74, (6) a mounting location 82 of piezoelectric motor 26 inside of fixed mount section 72, (7) a mounting location 84 of distance change feedback sensor 28 on fixed mount section 72, and (8)

a plurality of spring or spring-like motion/direction stabilizing elements 86, operatively connected to fixed mount section 72 and operatively connected to movable mount section 74, for stabilizing motion and/or direction of movable mount section 74, and therefore, for stabilizing motion and/or direction of movable mirror 24 during the real time high speed high resolution hyper-spectral imaging.

Figure 2C:
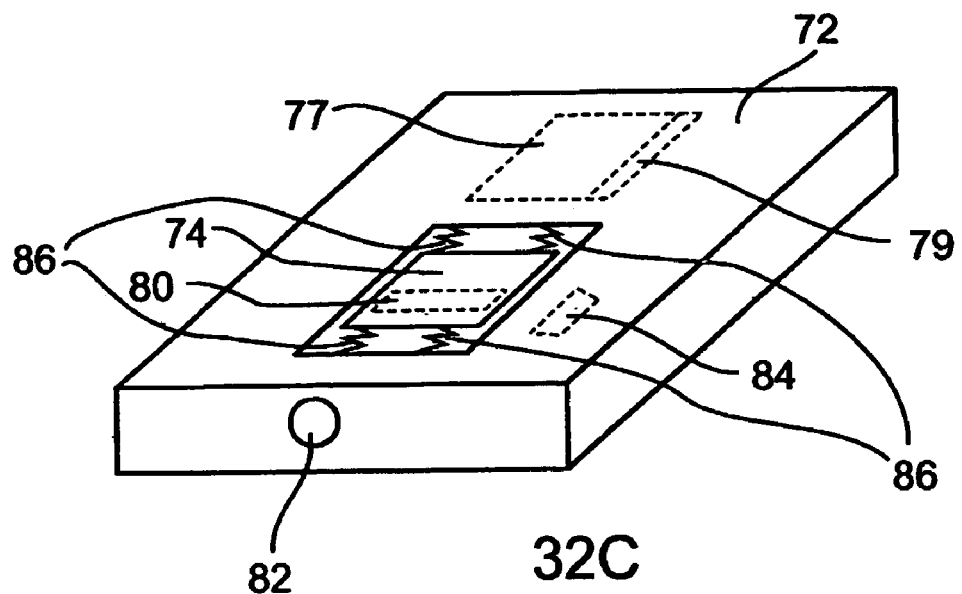
FIG. 2C is a schematic diagram illustrating a perspective view of an exemplary corresponding specific configuration 32C of the optical interferometer mount used as a thermo-mechanically stable mount for components of the optical interferometer 18 of the third alternative specific configuration 10C of the generalized preferred embodiment of the hyper-spectral imaging system illustrated in FIG. 1C, in accordance with the present invention.
Figure 2D:
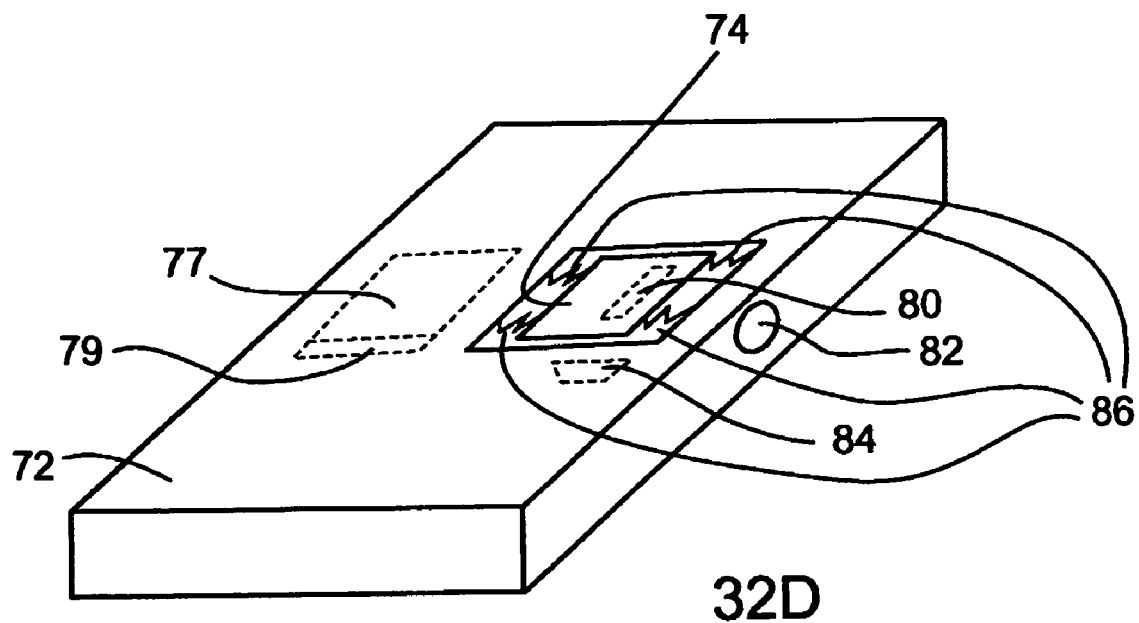
FIG. 2D is a schematic diagram illustrating a perspective view of an exemplary corresponding specific configuration 32D of the optical interferometer mount used as a thermo-mechanically stable mount for components of the optical interferometer 18 of the fourth alternative specific configuration 10D of the generalized preferred embodiment of the hyper-spectral imaging system illustrated in FIG. 1D, in accordance with the present invention.

For each of the third and fourth alternative specific configurations 10C and 10D, respectively, illustrated in FIGS. 1C and 1D, respectively, of the generalized preferred embodiment of the hyper-spectral imaging system 10, wherein optical interferometer 18 features cubic shaped beam splitter 20", each exemplary corresponding specific configuration 32C and 32D, respectively, illustrated in FIGS. 2C and 2D, respectively, of the optical interferometer mount 32 features the following primary components: (1) a fixed mount section 72, (2) a movable mount section 74, (3) a mounting location 77 of cubic beam splitter 20", including location 79 of fixed mirror 22 formed along an appropriate external edge of cubic beam splitter 20", (4) a mounting location 80 of movable mirror 24 on movable mount section 74, (5) a mounting location 82 of piezoelectric motor 26 inside of fixed mount section 72, (6) a mounting location 84 of distance change feedback sensor 28 on fixed mount section 72, and (7) a plurality of spring or spring-like motion/direction stabilizing elements 86, operatively connected to fixed mount section 72 and operatively connected to movable mount section 74, for stabilizing motion and/or direction of movable mount section 74, and therefore, for stabilizing motion and/or direction of movable mirror 24 during the real time high speed high resolution hyper-spectral imaging.

The specially designed and constructed optical interferometer mount 32, in general, and each exemplary corresponding specific configuration 32A, 32B, 32C, and 32D, in particular, exhibiting specific mechanical and thermo-mechanical physicochemical properties, characteristics, and behavior, of high rigidity, high dimensional stability, extremely low thermal (thermo-mechanical) expansion or expansibility, and extremely low mechanical sensitivity to temperature changes, achieved by featuring an extremely low coefficient of thermal expansion (CTE), functions as a thermo-mechanically stable mount for components, in particular, beam splitter 20 (rectangular beam splitter 20' in optical interferometer 18 of each alternative specific configuration 10A and 10B, or cubic beam splitter 20" in optical interferometer 18 of each alternative specific configuration 10C and 10D), fixed mirror 22, and movable mirror 24, of optical interferometer 18, which are used for piezoelectrically determining and changing the magnitude of the optical path difference (OPD) of divided collimated object emission beam 56, as previously described above.

The optical interferometer mount 32, including above listed components (1)-(8) thereof, is made of a single material, or is made of a combination of different materials, having variable three dimensional geometrical configuration or form, and dimensions, and having specific mechanical and thermo-mechanical physicochemical properties, characteristics, and behavior.

In general, the variable three dimensional geometrical configuration or form of the optical interferometer mount 32 is a variable three dimensional curvilinear structure having variable curvilinear dimensions, designed and constructed according to specific requirements, design, and operating parameters, of the components of optical interferometer 18, as used for the real time high speed high resolution hyper-spectral imaging. The three dimensional curvilinear structure of the optical interferometer mount 32 is a structure selected from the group consisting of a complex structure featuring a combination of at least two separate structures, and, an integral structure featuring either a single structure or an integral combination of at least two separate structures.

Preferably, the three dimensional curvilinear structure of the optical interferometer mount 32 is selected from the group consisting of a three dimensional polygon, a three dimensional circle, and, a three dimensional ellipse, having variable dimensions. More preferably, the optical interferometer mount 32 is a three dimensional polygon selected from the group consisting of a three dimensional square, a three dimensional rectangle, and, a three dimensional trapezoid, having variable dimensions. For example, as illustrated in FIGS. 1A-1D and in FIGS. 2A-2D, the optical interferometer mount 32 is a three dimensional square or rectangle, having variable dimensions.

Preferably, specific mechanical and thermo-mechanical physicochemical properties, characteristics, and behavior, of the optical interferometer mount 32, including above listed components (1)-(8) thereof, are high rigidity, high dimensional stability, extremely low thermal (thermo-mechanical) expansion or expansibility, and extremely low mechanical sensitivity to temperature changes, achieved by featuring an extremely low coefficient of thermal expansion (CTE), in particular, less than about $1.0 \times 10^{-4}/°K$, preferably, less than about $1.0 \times 10^{-5}/°K$ and more preferably, on the order of about $1.0 \times 10^{-6}/°K$.

Extremely low thermal (thermo-mechanical) expansion or expansibility, and extremely low mechanical sensitivity to temperature changes, achieved by featuring an extremely low coefficient of thermal expansion (CTE), are especially needed in order to reduce dependency of the optical path difference (OPD) of the divided collimated object emission beam 56, and changes thereof, on changes (increases or decreases) in temperature. A decrease of the dependency of the optical path different (OPD) of the divided collimated object emission beam 56 on temperature, decreases occurrence of possible errors and propagation thereof, during performing below described Step (f), of transforming improved interference images to the frequency domain by using a Fast-Fourier-Transform (FFT) procedure, leading to high accuracy and reproducibility during the synthesizing and analyzing of three-dimensional hyper-spectral (cube) images.

Accordingly, for the optical interferometer mount 32 at least partly made of a material which does not feature the above described specific mechanical and thermo-mechanical physicochemical properties, characteristics, and behavior, of high rigidity, high dimensional stability, extremely low thermal (thermo-mechanical) expansion or expansibility, and extremely low mechanical sensitivity to temperature changes, achieved by featuring an extremely low coefficient of thermal expansion (CTE), there is a need for a compensating phase calculation based on using temperature change data generated by at least one accurate and reproducible temperature sensor placed at a corresponding at least one location on, or inside of, the optical interferometer mount 32. Such a compensating phase calculation compensates the phase difference resulting from changes (increases and/or decreases) in temperature, of at least a part of the optical interferometer mount 32.

In principle, the optical interferometer mount 32, including above listed components (1)-(8) thereof, is made of any type of single material, or of any combination of different types of materials, exhibiting the above described specific mechanical and thermo-mechanical physicochemical properties, characteristics, and behavior, of high rigidity, high dimensional stability, extremely low thermal (thermo-mechanical) expansion or expansibility, and extremely low mechanical sensitivity to temperature changes, achieved by featuring an extremely low coefficient of thermal expansion (CTE), in particular, less than about $1.0 \times 10^{-4}/° K$, preferably, less than about $1.0 \times 10^{-5}/° K$, and more preferably, on the order of about $1.0 \times 10^{-6}/° K$.

Accordingly, the optical interferometer mount 32, including above listed components (1)-(8) thereof, is made of at least one type of material selected from the group consisting of metallic types of materials, solid non-metallic types of materials, and combinations thereof, exhibiting the above described specific mechanical and thermo-mechanical physicochemical properties, characteristics, and behavior. Metallic types of materials are selected from the group consisting of pure metallic types of materials and alloy or mixed metallic types of materials. Solid non-metallic types of materials are selected from the group consisting of pure solid non-metallic types of materials and mixed solid non-metallic types of materials.

A preferred alloy or mixed metallic type of material is selected from the group consisting of steels and stainless steels, exhibiting the above described specific mechanical and thermo-mechanical physicochemical properties, characteristics, and behavior, of high rigidity, high dimensional stability, extremely low thermal (thermo-mechanical) expansion or expansibility, and extremely low mechanical sensitivity to temperature changes, achieved by featuring an extremely low coefficient of thermal expansion (CTE).

More specifically, whereby the alloy or mixed metallic type of material is a steel alloy including at least one metal selected from the group consisting of nickel and cobalt. More specifically, whereby the steel alloy is selected from the group consisting of a steel alloy including about 36% nickel, a steel alloy containing steel and about 36% nickel, a steel alloy including about 36% nickel and up to about 5% cobalt, and, a steel alloy containing steel, about 36% nickel, and up to about 5% cobalt.

More specifically, whereby the alloy or mixed metallic type of material is a stainless steel alloy including at least one metal selected from the group consisting of nickel and cobalt. More specifically, whereby the stainless steel alloy is selected from the group consisting of a stainless steel alloy including about 36% nickel, a stainless steel alloy containing stainless steel and about 36% nickel, a stainless steel alloy including about 36% nickel and up to about 5% cobalt, and, a stainless steel alloy containing steel, about 36% nickel, and up to about 5% cobalt.

Preferably, the alloy or mixed metallic type of material used for making the optical interferometer mount 32, including above listed components (1)-(8) thereof, is a steel alloy selected from the group consisting of an INVAR steel alloy and an INVAR type of steel alloy. Alternatively, the alloy or mixed metallic type of material used for making the optical interferometer mount 32, including components thereof, is a stainless steel alloy selected from the group consisting of an INVAR stainless steel alloy and an INVAR type of stainless steel alloy.

INVAR steel alloys, INVAR types of steel alloys, INVAR stainless steel alloys, and INVAR types of stainless steel alloys, are well known in those fields, and to those of ordinary skill in the art of, for example, manufacturing of precision clocks, color cathode ray tubes (CRTs), and mechanical thermostats, either requiring, or involved with, the use of materials exhibiting specific mechanical and thermo-mechanical physicochemical properties, characteristics, and behavior, of high rigidity, high dimensional stability, low thermal (thermo-mechanical) expansion, and extremely low mechanical sensitivity to temperature changes, achieved by featuring a very low coefficient of thermal expansion (CTE).

INVAR is basically steel or stainless steel with 36% nickel, and other smaller amounts of other elements for added machinability and/or because a pure alloy is hard to obtain, and has a coefficient of thermal expansion (CTE) on the order of about $1.0 \times 10^{-6}/° K$. Three common types of INVAR alloys are (1) INVAR 36, (2) FM (Free Machining) INVAR, which has about twice the carbon content of INVAR 36, includes selenium, more manganese alloyed in, and is more convenient to work with than INVAR 36, and (3) SUPER INVAR, which has some cobalt added, and has an extremely low coefficient of thermal expansion (CTE) on the order of about $0.6 \times 10^{-6}/° K$.

A fourth, less known, type of INVAR, developed by NASA/JPL, is referred to as HP (High Purity) INVAR 36, including a low carbon content (less than about 0.01%), and which has an improved (lower) coefficient of thermal expansion (CTE) and dimensional stability over time, as described in the NASA Technical Support Package "Temporally and Thermally Stable Iron/Nickel Alloy", for the August 1995 issue of NASA Tech Briefs.

A preferred solid non-metallic type of material, used for making the optical interferometer mount 32, including above listed components (1)-(8) thereof, is selected from the group consisting of special quartzes, special glasses, special ceramics, and special glass ceramics, exhibiting the above described specific mechanical and thermo-mechanical physicochemical properties, characteristics, and behavior, of high rigidity, high dimensional stability, extremely low thermal (thermo-mechanical) expansion or expansibility, and extremely low mechanical sensitivity to temperature changes, achieved by featuring an extremely low coefficient of thermal expansion (CTE).

Step (c) includes performing a calibration procedure for calibrating changes in the magnitude of the optical path difference (OPD) of the divided collimated object emission beam 56, and therefore, calibrating the magnitude of the optical path difference (OPD) of the divided collimated object emission beam 56.

As previously described above, when the distance or position of movable mirror 24 along axis 60 changes, via actuation and operation of piezoelectric motor 26, the distance between the two plates of the capacitor of distance change feedback sensor 28 changes, causing a change in capacity concurrent with a change in the potential difference existing between the two capacitor plates. The potential difference existing between the two capacitor plates of distance change feedback sensor 28 is measured by piezoelectric motor controller 30. The relationship between the measurement of the potential difference existing between the two capacitor plates of distance change feedback sensor 28 and the optical path difference (OPD) of the divided collimated object emission beam 56, for actuating a required change in distance or position of movable mirror 24 along axis 60, is used for implementing the present invention. The calibration procedure is used for measuring and generating calibration values of this relationship, which are stored in a data/information look up table, herein, referred to as a piezo-look-up-table (PLUT).

Accordingly, there is measuring changes in the magnitude of the optical path difference (OPD), as a function of potential difference existing between the two capacitor plates measured by distance change feedback sensor 28, and storing the measured values in the piezo-look-up-table (PLUT). Generating calibration values which are stored in the piezo-look-up-table (PLUT) is done by performing different alternative calibration procedures.

In a first exemplary calibration procedure, calibration values stored in the piezo-look-up-table (PLUT) are generated by illuminating collimator 16 in a given alternative specific configuration 10A, 10B, 10C, or 10D, illustrated in FIGS. 1A, 1B, 1C, and 1D, respectively, of the generalized preferred embodiment of the hyper-spectral imaging system 10, using a laser beam, and determining the magnitude of the optical path difference (OPD) by analyzing the diffraction pattern formed on the surface of detector 36.

In a second exemplary calibration procedure, calibration values stored in the piezo-look-up-table (PLUT) are generated by removing collimator 16 and camera optics 34, and connecting an additional optical interferometer with a known magnitude of the optical path difference (OPD) of a divided collimated object emission beam, for example, in a range corresponding to that of the magnitude of the optical path difference (OPD) of the divided collimated object emission beam 56.

Performing either of the above described exemplary calibration procedures, includes obtaining a plurality of interference images, using optical interferometer 18, as described above, for each change in the magnitude of the optical path difference (OPD) of the divided collimated object emission beam 56, for the purpose of reducing measurement noise and improving measurement accuracy and interference image resolution. Preferably, there is obtaining a plurality of at least twenty, and up to about five-hundred, interference images for each change in the magnitude of the optical path difference (OPD).

Thus, for performing the real time high speed high resolution hyper-spectral imaging of objects 12 in scene or sample 14, in Step (c), at least one interference image is generated, preferably a plurality of interference images are generated, for each magnitude of the optical path difference (OPD) of the divided collimated object emission beam 56 piezoelectrically determined and changed, as described above, by central programming and control/data/information signal processing unit (CPPU) 38 sending, via the control/data links, a command, including data and information of the generated calibration values of the magnitude of the optical path difference (OPD) stored in the piezo-look-up-table (PLUT), to piezoelectric motor controller 30, for highly accurately and highly reproducibly actuating and controlling piezoelectric motor 26, for highly accurately and highly reproducibly displacing or moving movable mirror 24 along axis 60 of optical interferometer 18.

In Step (d), there is focusing and recording each generated interference image associated with a corresponding magnitude of optical path difference (OPD) of the divided collimated object emission beam, for forming a plurality of recorded interference images.

By implementing each of the four alternative specific configurations 10A, 10B, 10C, and 10D, illustrated in FIGS. 1A, 1B, 1C, and 1D, respectively, of the generalized preferred embodiment of the hyper-spectral imaging system 10 of the present invention, each interference image associated with a corresponding magnitude of optical path difference (OPD) of the divided collimated object emission beam 56, generated according to previous Step (c), is focused by camera or focusing optics, herein, generally referred to as camera optics 34, onto detector 36, for forming a plurality of recorded interference images.

Detector 36 is operatively connected, via control/data links, to camera optics 34, and operatively connected, via control/data links, to central programming and control/data/information signal processing unit (CPPU) 38, and functions by highly accurately and highly reproducibly recording the generated interference images focused by camera optics 34.

Detector 36 is either a one-dimensional pixels array detector, or preferably, a two-dimensional pixels matrix detector. For visible light, detector 36 is preferably a two-dimensional charge coupled device (CCD) matrix photo-detector, featuring high detection quantum efficiency, a high spatial resolution (small pixel size) and high sensitivity in a wide range of spectral regions (visible region to near infra-red (IR) region). The spectral region sensitivity of detector 36 encompasses at least a part of the spectral range of electromagnetic radiation of object emission beam 44 emitted by objects 12 in scene or sample 14. Detector 36 simultaneously captures a large volume of spectral data and information from camera optics 34, and rapidly transfers the captured spectral data and information to central programming and control/data/information signal processing unit (CPPU) 38, therefore enabling real time high speed high spatial and spectral resolution spectral imaging. Preferably, Step (d) includes storing the plurality of recorded interference images in an appropriate database, via CPPU 38, for use in processing, analyzing, and displaying, the recorded interference images, in particular, according to following Steps (e)-(k), described hereinbelow.

For implementing Step (d), optionally, an electromagnetic radiation filter, $F_3$, for additionally focusing electromagnetic radiation within a particular spectral region of interest, of first exiting beam 56c and second exiting beam 56d together exiting optical interferometer 18 and entering camera optics 34, as is well known in the art, is placed before camera optics 34, in each of the four alternative specific configurations 10A, 10B, 10C, and 10D, illustrated in FIGS. 1A, 1B, 1C, and 1D, respectively. For example, there is using a 400 nanometer cutoff radiation filter as electromagnetic radiation filter, $F_3$, for additionally focusing electromagnetic radiation within a particular spectral region of interest, of first exiting beam 56c and second exiting beam 56d together exiting optical interferometer 18 and entering camera optics 34.

Preferably, Step (d) includes storing the plurality of the recorded interference images in an appropriate database, via CPPU 38, for use in image processing, analyzing, and/or displaying, the recorded interference images, in particular, according to following Steps (e)-(k).

In Step (e), there is improving the quality of the plurality of recorded interference images, for forming a plurality of improved quality interference images.

By implementing each of the four alternative specific configurations 10A, 10B, 10C, and 10D, illustrated in FIGS. 1A, 1B, 1C, and 1D, respectively, of the generalized preferred embodiment of the hyper-spectral imaging system 10 of the present invention, the quality of the plurality of the interference images, recorded according to previous Step (d), is mathematically improved by using any combination of a variety of image correction processing procedures which are well known in the art, via central programming and control/data/information signal processing unit (CPPU) 38, for forming a plurality of improved quality interference images.

For accomplishing this, there is using any combination of the following image correction processing procedures: (i) filtering out noise from the plurality of recorded interference images, (ii) correcting distortions of specific spatial frequencies of the plurality of recorded interference images, (iii) correcting dynamic imaging errors associated with successively recording the plurality of generated interference images, and (iv) improving the resolution of the plurality of the recorded interference images.

In sub-step (i) of Step (e), there is filtering out noise from the plurality of recorded interference images, by passing the plurality of recorded interference images through a noise reduction filter. An exemplary noise reduction filter is an averaging type of noise reduction filter, filtering out high frequency noise components from the interference images generated during Step (c), which arise when recording the generated interference images in Step (d).

In sub-step (ii) of Step (e), there is correcting distortions of specific spatial frequencies of the recorded interference images, which usually arise due to imperfections in the construction and/or operation of optical interferometer 18. An ideal optical interferometer produces homogeneous interference images for a homogeneous viewed object. Due to imperfections in the construction and/or operation of optical interferometer 18, at least some of the recorded interference images are not homogeneous, but feature amplified and/or attenuated intensities at specific spatial frequencies. Such imperfections and distortions appearing in the recorded interference images are usually the result of imperfections in, or misalignment of, optical components of optical interferometer 18, in particular, beam splitter 20 (in particular, rectangular beam splitter 20', or cubic shaped beam splitter 20"), fixed mirror 22, and/or movable mirror 24. Distortions of spatial frequencies typically exhibit a fixed pattern, and therefore, once measured, can be stored in an appropriate spatial frequency distortion correction look-up table, to be rapidly and reproducibly used for improving the quality of the recorded interference images.

In sub-step (iii) of Step (e), there is correcting dynamic imaging errors associated with successively recording the generated interference images. Dynamic imaging errors associated with successively recorded interference images results from movements of the line-of-sight of hyper-spectral imaging system 10. For example, when dealing with images having a crosshair, or similar type of operator assisting focusing element, the crosshair may move between successively recorded interference images. Such dynamic imaging errors are typically corrected by applying a translation correction procedure to the plurality of recorded interference images.

In sub-step (iv) of Step (e), there is improving the resolution of the recorded interference images by using appropriate image resolution improvement procedures. There is a wide variety of different image processing procedures used for improving the resolution of interference images, which are well known in the art, for example, 'Super Resolution' image processing procedures. In general, Super Resolution image processing procedures utilize a few images of a same scene or sample, for example, in the present invention, a few recorded interference images of the same scene or sample 14 (FIGS. 1A-1D), each featuring a slightly different magnitude of the optical path difference (OPD), for calculating an output interference image having higher resolution than a corresponding input interference image.

By implementing the present invention, preferably, the plurality of generated interference images, each featuring a slightly different magnitude of the optical path difference (OPD), are obtained by modulating piezoelectric motor 26 (FIGS. 1A-1D) while performing above Step (d), of recording a plurality of at least twenty, and up to about five-hundred, generated interference images for each change in the magnitude of the optical path difference (OPD).

Preferably, Step (e) includes storing the plurality of improved quality interference images in an appropriate database, via CPPU 38, for use in image processing, analyzing, and/or displaying, the improved quality interference images, in particular, according to following Steps (f)-(k).

In Step (f), there is transforming each of the plurality of improved quality interference images to the frequency domain, for forming a corresponding plurality of interferogram images.

By implementing each of the four alternative specific configurations 10A, 10B, 10C, and 10D, illustrated in FIGS. 1A, 1B, 1C, and 1D, respectively, of the generalized preferred embodiment of the hyper-spectral imaging system 10 of the present invention, each of the plurality of improved quality interference images, formed according to previous Step (e), is transformed from the time domain to the frequency domain, preferably, by using a Fast-Fourier-Transform (FFT) procedure, via central programming and control/data/information signal processing unit (CPPU) 38, for forming a corresponding plurality of interferogram images.

As is well known in the art, Fast-Fourier-Transform (FFT) is the general term referring to different types of discrete Fourier transforms, also referred to as DFT, which are used for transforming signals in the time domain to their corresponding representation in the frequency domain. Accordingly, interferogram images, as formed by completing Step (f), are the corresponding representation in the frequency domain, of the interference images in the time domain, recorded in Step (d) and quality improved in Step (e).

Preferably, Step (f) includes storing the plurality of interferogram images in an appropriate database, via CPPU 38, for use in image processing, analyzing, and/or displaying, the interferogram images, in particular, according to following Steps (g)-(k).

Completion of Step (f) results in generating real time high spatial resolution and high spectral resolution interferogram images, which are preferably used for synthesizing and analyzing high resolution highly reproducible three-dimensional hyper-spectral (cube) images, in accordance with the present invention of a method and system for real time high speed high resolution hyper-spectral imaging.

The present invention is applicable to essentially any field or sub-field of science or technology, where there is need or interest for real time high speed high resolution hyper-spectral imaging of objects in a scene or sample, such as objects 12 in scene or sample 14, which emit electromagnetic radiation in the form of an object emission beam 44 characterized by an emission spectrum, and analyzing the hyper-spectral (cube) images synthesized therefrom, for the main purpose of obtaining meaningful and useful data and information about the objects in the scene or sample.

The method of the present invention optionally, includes the following additional steps, Steps (g)-(k), specifically for further processing, analyzing, and/or displaying, the interference images and/or the interferogram images, obtained in above described Steps (a)-(f). As previously stated and illustratively described hereinabove, and as described hereinbelow, the method of the present invention, featuring above described Steps (a)-(f), and optionally, below described additional Steps (g)-(k), is implemented in the same manner for each of the four alternative specific configurations 10A, 10B, 10C, and 10D, illustrated in FIGS. 1A, 1B, 1C, and 1D, respectively, of the generalized preferred embodiment of the hyper-spectral imaging system of the present invention.

In optional, additional Step (g), there is improving the quality of each of the plurality of interferogram images by mathematically increasing the maximum magnitude of the optical path difference (OPD) available in the hyper-spectral imaging system, for forming a plurality of improved quality interferogram images.

By implementing each of the four alternative specific configurations 10A, 10B, 10C, and 10D, illustrated in FIGS. 1A, 1B, 1C, and 1D, respectively, of the generalized preferred embodiment of the hyper-spectral imaging system 10 of the present invention, the quality of each of the plurality of interferogram images, formed according to previous Step (f), is improved by mathematically increasing the maximum magnitude of the optical path difference (OPD) available in the hyper-spectral imaging system 10, via central programming and control/data/information signal processing unit (CPPU) 38, for forming a plurality of improved quality interferogram images.

After completing scanning of a pre-determined range of the magnitude of the optical path difference (OPD), in particular, in accordance with hereinabove previously described Step (c), of piezoelectrically determining and changing the magnitude of the optical path difference (OPD) of the divided collimated object emission beam 56, for generating at least one interference image for each magnitude of the optical path difference (OPD), each pixel has been measured through the entire range of magnitudes of the optical path difference (OPD) of the divided collimated object emission beam 56 available in: the system, but the exact spectral distribution can not be reconstructed by Fast Fourier Transform (FFT), since optical interferometer 18 is restricted to a finite maximum magnitude of the optical path difference (OPD) of the divided collimated object emission beam 56.

The restriction to finite path difference truncates the actually recorded interference images to the maximum magnitude of the optical path different (OPD). As is known in the art, in mathematical form, the recorded interference images are convolved with the following rectangular or window function:

$$\Pi(x) = \begin{cases} 1, |x| < \max OPD \\ 0, |x| > \max OPD \end{cases}$$

By actuating piezoelectric motor 26, via piezoelectric motor controller 30, for highly accurately and highly reproducibly displacing or moving movable mirror 24 along axis 60, as previously described in Step (c), above, the maximum displacement or movement of mirror 24 along axis 60 determines the maximum magnitude of the optical path difference (OPD) attainable, which is related to the spectral resolution of the measurement. The step size, known in the art as the optical path difference (OPD) step, used for piezoelectrically changing the magnitude of the optical path difference (OPD) of the divided collimated object emission beam 56, by displacing or moving movable mirror 24 along axis 60, determines the magnitude of the change of the optical path difference (OPD), which is, in turn, dictated by the shortest wavelength to which the hyper-spectral imaging system 10 is sensitive.

Convolving the recorded interference images with a rectangular function reduces resolution of the hyper-spectral imaging system 10. Resolution of the interferogram images is improved by either: (i) physically increasing the maximum magnitude of the optical path difference (OPD), or (b) mathematically increasing the maximum magnitude of the optical path difference (OPD), by decreasing the effect of convolving the recorded interference images with the rectangular function, by applying, for example, a deconvolution procedure to the interferogram images.

Increasing the maximum magnitude of the optical path difference (OPD) reduces mirror 24 positioning accuracy and reduces the rate of scanning the desired range of the magnitude of the optical path difference (OPD). As a result, increasing the maximum magnitude of the optical path difference (OPD) reduces imaging reproducibility, precludes using the Super Resolution image processing procedures previously described in sub-step (iv) of Step (e), above, and thereby, decreases the speed of the real time hyper-spectral imaging. In order to maintain a low maximum magnitude of the optical path difference (OPD) while improving sensitivity of the hyper-spectral imaging system 10, the result of previously described Step (f), above, of transforming the plurality of improved quality interference images to the frequency domain by using a Fast-Fourier-Transform (FFT) procedure, for forming a corresponding plurality of interferogram images, is deconvolutioned with a sinc function, mathematically written as [sin(x)/x], as is well known in the art. Preferably, deconvolution of the interferogram images is performed using a $(sinc)^2$ function, due to the fact that detector 36 records only the power of the interference image signals without information regarding the phase of the interference image signals. This procedure results in forming a plurality of improved quality interferogram images.

Preferably, Step (g) includes storing the plurality of improved quality interferogram images in an appropriate database, via CPPU 38, for use in image processing, analyzing, and/or displaying, the improved quality interferogram images, in particular, according to following Steps (h)-(k).

In optional, additional Step (h), there is correcting the phase of the pixels in each of the plurality of improved quality interferogram images, for forming a plurality of phase corrected improved quality interferogram images.

By implementing each of the four alternative specific configurations 10A, 10B, 10C, and 10D, illustrated in FIGS. 1A, 1B, 1C, and 1D, respectively, of the generalized preferred embodiment of the hyper-spectral imaging system 10 of the present invention, the phase of the pixels in each of the plurality of the improved quality interferogram images, formed according to previous Step (g), is corrected, via central programming and control/data/information signal processing unit (CPPU) 38, for forming a plurality of phase corrected improved quality interferogram images.

Optional, additional Step (h) is required whenever the optics of the hyper-spectral imaging system 10 introduce aberrations causing phase shifts between neighboring pixels in the recorded interference images. Accordingly, correcting the phase of the pixels in the recorded interference images is performed by correcting the phase of the pixels in the improved quality interferogram images. Correcting the phase of the pixels in the improved quality interferogram images is a linear correction, correcting optical aberrations in the image domain. For example, when illumination mechanism 42 operates with coherent laser beam, there should be 'sinc' shaped intensity associated with each pixel. By using standard algorithms of maximum power location, also known in the art as 'peak location' algorithms, the phase of the pixels in each of the improved quality interferogram images is corrected.

Preferably, Step (h) includes storing the plurality of phase corrected improved quality interferogram images in an appropriate database, via CPPU 38, for use in image processing, analyzing, and/or displaying, the improved quality interferogram images, in particular, according to following Steps (i)-(k).

In optional, additional Step (i), there is transforming each of the plurality of the phase corrected improved quality interferogram images, from wave number units to uniformly dispersed wavelength units, for forming a synthesized hyperspectral (cube) image.

By implementing each of the four alternative specific configurations 10A, 10B, 10C, and 10D, illustrated in FIGS. 1A, 1B, 1C, and 1D, respectively, of the generalized preferred embodiment of the hyper-spectral imaging system 10 of the present invention, each of the plurality of the phase corrected improved quality interferogram images, formed according to previous Step (h), is transformed from wave number units to uniformly dispersed wavelength units, via central programming and control/data/information signal processing unit (CPPU) 38, for forming a synthesized hyper-spectral (cube) image.

The results of previously described Step (f), above, of transforming each of the plurality of improved quality interference images to the frequency domain by using a Fast-Fourier-Transform (FFT) procedure, for forming a corresponding plurality of interferogram images, and the results of previously described Step (h), of correcting the phase of the pixels in each of the plurality of improved quality interferogram images, for forming a plurality of phase corrected improved quality interferogram images, are expressed in units of wave number. Therefore, the units of wave number are preferably transformed to units of wavelength. Each plurality of the wave number transformed phase corrected improved quality interferogram images, expressed in units of wavelength, are arranged in the form of a synthesized hyper-spectral (cube) image.

Each of the plurality of interferogram images, expressed in units of wave number, formed in previously described Step (f) and Step (h), above, typically features unequally spaced intervals of the wave numbers along a wave number axis. Optional, additional Step (i), optionally includes re-scaling (multiplying by a constant), translating (shifting by a constant), and/or interpolating, the wave numbers of the plurality of the phase corrected improved quality interferogram images, prior to transforming the units of wave number to units of wavelength. This procedure results in forming uniformly dispersed wave number transformed phase corrected improved quality interferogram images. Then, each plurality of uniformly dispersed wave number transformed phase corrected improved quality interferogram images, expressed in units of wavelength, are arranged in the form of a synthesized hyper-spectral (cube) image.

Preferably, Step (i) includes storing each synthesized hyper-spectral (cube) image in an appropriate database, via CPPU 38, for use in optionally analyzing and/or displaying, the synthesized plurality of hyper-spectral (cube) images, in particular, according to following Steps (j)-(k).

In optional, additional Step (O), there is analyzing a plurality of the synthesized hyper-spectral (cube) images.

By implementing each of the four alternative specific configurations 10A, 10B, 10C, and 10D, illustrated in FIGS. 1A, 1B, 1C, and 1D, respectively, of the generalized preferred embodiment of the hyper-spectral imaging system 10 of the present invention, there is analyzing a plurality of synthesized hyper-spectral (cube) images, formed according to previous Step (i), by applying one or more image analysis algorithms, via central programming and control/data/information signal processing unit (CPPU) 38.

For example, there is analyzing the synthesized plurality of hyper-spectral (cube) images by applying pattern recognition and classification types of image analysis algorithms. Specific types of image analysis algorithms used for analyzing the synthesized plurality of hyper-spectral (cube) images are selected according to the specific application of the present invention. As previously stated, in principle, the present invention is applicable to essentially any field or sub-field of science or technology, where there is need or interest for real time high speed high resolution hyper-spectral imaging of objects in a scene or sample, such as objects 12 in scene or sample 14, which emit electromagnetic radiation in the form of an object emission beam 44 characterized by an emission spectrum, and analyzing the hyper-spectral (cube) images synthesized therefrom, for the main purpose of obtaining meaningful and useful data and information about the objects in the scene or sample.

In optional, additional Step (k), there is displaying any of the plurality of interference images, interferogram images, and/or hyper-spectral (cube) images, obtained in previous Steps (d)-(i), and/or results of analyses thereof, obtained in previous Step (j).

For implementing each of the four alternative specific configurations 10A, 10B, 10C, and 10D, illustrated in FIGS. 1A, 1B, 1C, and 1D, respectively, of the generalized preferred embodiment of the hyper-spectral imaging system 10 of the present invention, there is displaying, via display device 40, either singly or in combination: the recorded interference images obtained in Step (d), the plurality of improved quality recorded interference images obtained in Step (e), the plurality of interferogram images obtained in Step (f), the plurality of improved quality interferogram images obtained in Step (g), the plurality of phase corrected improved quality interferogram images obtained in Step (h), the plurality of synthesized hyper-spectral (cube) images obtained in Step (i), and the results of the analysis of the synthesized plurality of hyper-spectral (cube) images obtained in Step (j).

Display device 40 is operatively connected, via control/data links, to central programming and control/data/information signal processing unit (CPPU) 38, and functions by highly accurately and highly reproducibly displaying either singly or in combination any of the above indicated images and/or results of analyses thereof.

Thus, it is understood from the embodiments of the invention herein described and illustrated, above, that the method and system for real time high speed high resolution hyper-spectral imaging of the present invention, based on using piezoelectric technology with closed loop control and analysis algorithms, for enabling real time high speed high resolution nanometer accuracy movement of a movable mirror in an optical interferometer, along with using a specially designed and constructed optical interferometer mount as part of the optical interferometer, for achieving high thermo-mechanical stability of mounted optical interferometer components during the real time hyper-spectral imaging, resulting in high speed generating of high resolution interferogram images used for synthesizing and analyzing high resolution highly reproducible three-dimensional hyper-spectral (cube) images, are neither anticipated or obviously derived from the prior art.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described in conjunction with specific embodiments and examples thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for real time hyper-spectral imaging, comprising the steps of:
   (a) emitting electromagnetic radiation in a form of an object emission beam, by objects in a scene or a sample, and collimating said object emission beam, using an electromagnetic radiation collimating element, for forming a collimated object emission beam;
   (b) receiving and dividing said collimated object emission beam by an optical interferometer, for forming a divided collimated object emission beam having an optical path difference, and for generating an interference image exiting said optical interferometer, wherein said optical interferometer includes:
      (i) a beam splitter, onto which said collimated object emission beam is incident, and by which said collimated object emission beam is divided into two beams,
      (ii) a fixed mirror operatively positioned relative to said beam splitter,
      (iii) a movable mirror operatively positioned relative to said fixed mirror and to said beam splitter, and wherein said fixed mirror and said movable mirror each receives and reflects one of said two beams, such that a difference exists in lengths of optical path traveled by said two beams exiting said optical interferometer, thereby forming said optical path difference,
      (iv) a piezoelectric motor, operatively connected to said movable mirror,
      (v) a distance change feedback sensor, operatively connected to said movable mirror,
      (vi) a piezoelectric motor controller, operatively connected to said piezoelectric motor and to said distance change feedback sensor, and
      (vii) an optical interferometer mount, as a mount of said beam splitter, said fixed mirror, said movable mirror, said piezoelectric motor, and said distance change feedback sensor, wherein said optical interferometer mount includes:
         (1) a fixed mount section,
         (2) a movable mount section,
         (3) a mounting location of said beam splitter on said fixed mount section,
         (4) a mounting location of said fixed mirror on said fixed mount section,
         (5) a mounting location of said movable mirror on said movable mount section,
         (6) a mounting location of said piezoelectric motor inside of said fixed mount section, and
         (7) a mounting location of said distance change feedback sensor on said fixed mount section;
   (c) determining and piezoelectrically changing magnitude of said optical path difference of said divided collimated object emission beam, by said optical interferometer, for generating at least one said interference image for each said magnitude of said optical path difference, including steps of:
      (i) displacing said movable mirror along an axis of said divided collimated object emission beam by said piezoelectric motor,
      (ii) sensing and measuring change in distance of said movable mirror along said axis by said distance change feedback sensor, and
      (iii) actuating and controlling said piezoelectric motor by said piezoelectric motor controller; and
   (d) focusing and recording each said generated interference image associated with a corresponding said magnitude of said optical path difference, for forming a plurality of recorded interference images.

2. The method of claim 1, wherein step (a) said objects inherently emit said electromagnetic radiation of said object emission beam as a result of inherent body thermal heat emitted by said objects.

3. The method of claim 1, wherein step (a) said objects emit said electromagnetic radiation of said object emission beam as a result of excitation by incident electromagnetic radiation supplied by an external source radiating said incident electromagnetic radiation upon said objects.

4. The method of claim 3, wherein said incident electromagnetic radiation is in a form of light selected from the group consisting of polychromatic light, monochromatic light, poly- or multi-monochromatic light, and, combinations thereof.

5. The method of claim 1, wherein step (b) includes the steps of:
   (i) passing a first part of said collimated object emission beam through said beam splitter and onto said fixed mirror, while reflecting a second part of said collimated beam off said beam splitter and onto said movable mirror, and
   (ii) reflecting said first part of said collimated object emission beam off said fixed mirror, onto and off said beam splitter, for forming a first exiting beam exiting said optical interferometer, while reflecting and passing said second part of said collimated object emission beam off said movable mirror and through said beam splitter, respectively, for forming a second exiting beam exiting said optical interferometer together with said first exiting beam, thereby generating said interference image.

6. The method of claim 1, wherein step (b) includes the steps of:
   (i) passing a first part of said collimated object emission beam through said beam splitter and onto said movable mirror, while reflecting a second part of said collimated beam off said beam splitter and onto said fixed mirror, and
   (ii) reflecting said first part of said collimated object emission beam off said movable mirror, onto and off said beam splitter, for forming a first exiting beam exiting said optical interferometer, while reflecting and passing said second part of said collimated object emission beam off said fixed mirror and through said beam splitter, respectively, for forming a second exiting beam exiting said optical interferometer together with said first exiting beam, thereby generating said interference image.

7. The method of claim 1, wherein step (c) extent of said piezoelectrically changing said magnitude of said optical path difference of said divided collimated object emission beam along said axis is in a range of from about zero wavelengths to about ten wavelengths of said divided collimated object emission beam.

8. The method of claim 1, wherein step (c) maximum of said magnitude of said optical path difference of said divided collimated object emission beam is on order of ten wavelengths of said divided collimated object emission beam.

9. The method of claim 1, wherein said piezoelectric motor controller operates as a closed loop controller of said change in distance of said movable mirror along said axis.

10. The method of claim 1, wherein said piezoelectric motor controller operates by applying AC voltage or current to said distance change feedback sensor.

11. The method of claim 10, wherein said AC voltage is generated by a stable sinusoidal signal generator stabilized by an amplitude stabilizer.

12. The method of claim 1, wherein said distance change feedback sensor is in a form of a capacitor sensor, including a capacitor having two plates, and being configured such that a first plate of said capacitor is connected to said movable mirror, and a second plate of said capacitor is connected to said optical interferometer mount.

13. The method of claim 12, wherein distance of said movable mirror along said axis changes via actuation and operation of said piezoelectric motor, such that distance between said two plates of said capacitor changes, causing a change in capacity concurrent with a change in potential difference existing between said two capacitor plates.

14. The method of claim 13, wherein said potential difference existing between said two capacitor plates of said distance change feedback sensor is measured by said piezoelectric motor controller.

15. The method of claim 14, wherein step (c) said actuating and controlling said piezoelectric motor by said piezoelectric motor controller is performed according to said measurement of said potential difference, and according to a required change in said distance of said movable mirror along said axis received by said piezoelectric motor controller in a form of a command sent by a signal processing unit operatively connected to said piezoelectric motor controller.

16. The method of claim 1, wherein step (c) further includes a calibration procedure for calibrating changes in said magnitude of said optical path difference of said divided collimated object emission beam, and for calibrating said magnitude of said optical path difference of said divided collimated object emission beam.

17. The method of claim 13, wherein step (c) further includes a calibration procedure for calibrating changes in said magnitude of said optical path difference of said divided collimated object emission beam, and for calibrating said magnitude of said optical path difference of said divided collimated object emission beam.

18. The method of claim 17, wherein said calibration procedure includes measuring and generating calibration values of a relationship between said potential difference existing between said two capacitor plates of said distance change feedback sensor and said optical path difference of said divided collimated object emission beam, for actuating a said change in said distance of said movable mirror along said axis.

19. The method of claim 1, wherein step (d) each said interference image is focused by camera optics.

20. The method of claim 19, wherein electromagnetic radiation within a particular spectral region of interest of each said interference image exiting said optical interferometer is additionally focused by an electromagnetic radiation filter placed before said camera optics.

21. The method of claim 1, further comprising the step of:
(e) mathematically improving quality of said plurality of recorded interference images, via a central programming and control/data/information signal processing unit, for forming a plurality of improved quality interference images, wherein results thereof are stored in a database.

22. The method of claim 21, wherein step (e) includes the step of: filtering out noise from said plurality of recorded interference images, by passing said plurality of recorded interference images through a noise reduction filter, via said central programming and control/data/information signal processing unit, wherein results thereof are stored in said database.

23. The method of claim 21, wherein step (e) includes the step of: correcting distortions of specific spatial frequencies of said recorded interference images, due to imperfections in construction and/or operation of said optical interferometer, by using a spatial frequency distortion correction look-up table, via said central programming and control/data/information signal processing unit, wherein results thereof are stored in said database.

24. The method of claim 21, wherein step (e) includes the step of: correcting dynamic imaging errors associated with successively recording each
said generated interference image, resulting from movements of line-of-sight during the hyper-spectral imaging, by applying a translation correction procedure to said plurality of recorded interference images, via said central programming and control/data/information signal processing unit, wherein results thereof are stored in said database.

25. The method of claim 21, wherein step (e) includes the step of: improving resolution of said plurality of recorded interference images, by using an image resolution improvement procedure, via said central programming and control/data/information signal processing unit, wherein results thereof are stored in said database.

26. The method of claim 1, wherein a plurality of said generated interference images, each featuring a slightly different said magnitude of said optical path difference, is obtained by modulating said piezoelectric motor while performing step (d), of recording a plurality of at least twenty, and up to about five-hundred, said generated interference images for each said change in said magnitude of said optical path difference.

27. The method of claim 21, further comprising the step of:
(f) transforming each of said plurality of improved quality interference images from time domain to frequency domain, via said central programming and control/data/information signal processing unit, for forming a corresponding plurality of interferogram images, wherein results thereof are stored in said database.

28. The method of claim 27, wherein said transforming is performed by using a Fast-Fourier-Transform procedure, via said central programming and control/data/information signal processing unit, wherein results thereof are stored in said database.

29. The method of claim 27, wherein said plurality of interferogram images are used for synthesizing and analyzing three-dimensional hyper-spectral cube images, via said central programming and control/data/information signal processing unit, wherein results thereof are stored in said database.

30. The method of claim 27, further comprising the step of:
(g) improving quality of each of said plurality of interferogram images by mathematically increasing maximum of said magnitude of said optical path difference, via said central programming and control/data/information signal processing unit, for forming a plurality of improved quality interferogram images, wherein results thereof are stored in said database.

31. The method of claim 30, wherein the step (g) said plurality of interferogram images is deconvolutioned using a sinc function, via said central programming and control/data/information signal processing unit, wherein results thereof are stored in said database.

32. The method of claim 30, wherein the step (g) said plurality of interferogram images is deconvolutioned using a (sinc)$^2$ function, via said central programming and control/data/information signal processing unit, wherein results thereof are stored in said database.

33. The method of claim 30, further comprising the step of:
(h) correcting phase of pixels in each of said plurality of improved quality interferogram images, via said central programming and control/data/information signal processing unit, for forming a plurality of phase corrected improved quality interferogram images, wherein results thereof are stored in said database.

34. The method of claim 13, further comprising the step of:
(i) transforming each of said plurality of phase corrected improved quality interferogram images, from wave number units to uniformly dispersed wavelength units, via said central programming and control/data/information signal processing unit, for forming a synthesized hyper-spectral cube image, wherein results thereof are stored in said database.

35. The method of claim 34, further comprising the step of:
(j) analyzing a plurality of said synthesized hyper-spectral cube images, by applying a pattern recognition and classification type of image analysis algorithm, via said central programming and control/data/information signal processing unit, wherein results thereof are stored in said database.

36. A method for real time dividing a collimated object emission beam of electromagnetic radiation emitted by objects in a scene or a sample, and, determining and piezoelectrically changing the magnitude of an optical path difference of the divided collimated object emission beam thereof, by an optical interferometer, comprising the steps of:
(a) receiving and dividing the collimated object emission beam by the optical interferometer, for forming the divided collimated object emission beam having the optical path difference, wherein the optical interferometer includes:
  (i) a beam splitter, onto which the collimated object emission beam is incident, and by which the collimated object emission beam is divided into two beams,
  (ii) a fixed mirror operatively positioned relative to said beam splitter,
  (iii) a movable mirror operatively positioned relative to said fixed mirror and to said beam splitter, and wherein said fixed mirror and said movable mirror each receives and reflects one of said two beams, such that a difference exists in lengths of optical path traveled by said two beams exiting the optical interferometer, thereby forming the optical path difference,
  (iv) a piezoelectric motor, operatively connected to said movable mirror,
  (v) a distance change feedback sensor, operatively connected to said movable mirror,
  (vi) a piezoelectric motor controller, operatively connected to said piezoelectric motor and to said distance change feedback sensor, and
  (vii) an optical interferometer mount, as a mount of said beam splitter, said fixed mirror, said movable mirror, said piezoelectric motor, and said distance change feedback sensor, wherein said optical interferometer mount includes:
    (1) a fixed mount section,
    (2) a movable mount section,
    (3) a mounting location of said beam splitter on said fixed mount section,
    (4) a mounting location of said fixed mirror on said fixed mount section,
    (5) a mounting location of said movable mirror on said movable mount section,
    (6) a mounting location of said piezoelectric motor inside of said fixed mount section, and
    (7) a mounting location of said distance change feedback sensor on said fixed mount section;
(b) displacing said movable mirror along an axis of the divided collimated object emission beam by said piezoelectric motor;
(c) sensing and measuring change in distance of said movable mirror along said axis by said distance change feedback sensor; and
(d) actuating and controlling said piezoelectric motor by said piezoelectric motor controller.

37. The method of claim 36, wherein the objects inherently emit the electromagnetic radiation of the object emission beam as a result of inherent body thermal heat emitted by the objects.

38. The method of claim 36, wherein the objects emit the electromagnetic radiation of the object emission beam as a result of excitation by incident electromagnetic radiation supplied by an external source radiating incident electromagnetic radiation upon the objects.

39. The method of claim 38, wherein said incident electromagnetic radiation is in a form of light selected from the group consisting of polychromatic light, monochromatic light, poly- or multi-monochromatic light, and, combinations thereof.

40. The method of claim 36, wherein step (a) includes the steps of:
(i) passing a first part of the collimated object emission beam through said beam splitter and onto said fixed mirror, while reflecting a second part of the collimated beam off said beam splitter and onto said movable mirror, and
(ii) reflecting said first part of the collimated object emission beam off said fixed mirror, onto and off said beam splitter, for forming a first exiting beam exiting the optical interferometer, while reflecting and passing said second part of the collimated object emission beam off said movable mirror and through said beam splitter, respectively, for forming a second exiting beam exiting the optical interferometer together with said first exiting beam, thereby generating an interference image.

41. The method of claim 36, wherein step (a) includes the steps of:
(i) passing a first part of the collimated object emission beam through said beam splitter and onto said movable mirror, while reflecting a second part of the collimated beam off said beam splitter and onto said fixed mirror, and
(ii) reflecting said first part of the collimated object emission beam off said movable mirror, onto and off said beam splitter, for forming a first exiting beam exiting the optical interferometer, while reflecting and passing said second part of the collimated object emission beam off said fixed mirror and through said beam splitter, respectively, for forming a second exiting beam exiting the optical interferometer together with said first exiting beam, thereby generating an interference image.

42. The method of claim 36, wherein extent of the piezoelectrically changing the magnitude of the optical path difference of the divided collimated object emission beam along said axis is in a range of from about zero wavelengths to about ten wavelengths of the divided collimated object emission beam.

43. The method of claim 36, wherein maximum magnitude of the optical path difference of the divided collimated object emission beam is on order of ten wavelengths of the divided collimated object emission beam.

44. The method of claim 36, wherein said piezoelectric motor controller operates as a closed loop controller of said change in distance of said movable mirror along said axis.

45. The method of claim 36, wherein said piezoelectric motor controller operates by applying AC voltage or current to said distance change feedback sensor.

46. The method of claim 45, wherein said AC voltage is generated by a stable sinusoidal signal generator stabilized by an amplitude stabilizer.

47. The method of claim 36, wherein said distance change feedback sensor is in a form of a capacitor sensor, including a capacitor having two plates, and being configured such that a first plate of said capacitor is connected to said movable mirror, and a second plate of said capacitor is connected to said optical interferometer mount.

48. The method of claim 47, wherein distance of said movable mirror along said axis changes via actuation and operation of said piezoelectric motor, such that distance between said two plates of said capacitor changes, causing a change in capacity concurrent with a change in potential difference existing between said two capacitor plates.

49. The method of claim 48, wherein said potential difference existing between said two capacitor plates of said distance change feedback sensor is measured by said piezoelectric motor controller.

50. The method of claim 49, wherein step (d) said actuating and controlling said piezoelectric motor by said piezoelectric motor controller is performed according to said measurement of said potential difference, and according to a required change in said distance of said movable mirror along said axis received by said piezoelectric motor controller in a form of a command sent by a signal processing unit operatively connected to said piezoelectric motor controller.

51. The method of claim 36, further including a calibration procedure for calibrating changes in the magnitude of the optical path difference of the divided collimated object emission beam, and for calibrating the magnitude of the optical path difference of the divided collimated object emission beam.

52. The method of claim 48, further including a calibration procedure for calibrating changes in the magnitude of the optical path difference of the divided collimated object emission beam, and for calibrating the magnitude of the optical path difference of the divided collimated object emission beam.

53. The method of claim 52, wherein said calibration procedure includes measuring and generating calibration values of a relationship between said potential difference existing between said two capacitor plates of said distance change feedback sensor and the optical path difference of the divided collimated object emission beam, for actuating a said change in said distance of said movable mirror along said axis.

54. A system for real time hyper-spectral imaging, comprising:
(a) an electromagnetic radiation collimating element, for collimating electromagnetic radiation emitted by objects in a scene or a sample, for forming a collimated object emission beam;
(b) an optical interferometer, for receiving and dividing said collimated object emission beam, for forming a divided collimated object emission beam having an optical path difference, and for generating an interference image exiting said optical interferometer, said optical interferometer includes:
  (i) a beam splitter, onto which said collimated object emission beam is incident, and by which said collimated object emission beam is divided into two beams,
  (ii) a fixed mirror operatively positioned relative to said beam splitter,
  (iii) a movable mirror operatively positioned relative to said fixed mirror and to said beam splitter, and wherein said fixed mirror and said movable mirror each receives and reflects one of said two beams, such that a difference exists in lengths of optical path traveled by said two beams exiting said optical interferometer, thereby forming said optical path difference,
  (iv) a piezoelectric motor, operatively connected to said movable mirror,
  (v) a distance change feedback sensor, operatively connected to said movable mirror,
  (vi) a piezoelectric motor controller, operatively connected to said piezoelectric motor and to said distance change feedback sensor, and
  (vii) an optical interferometer mount, as a mount of said beam splitter, said fixed mirror, said movable mirror, said piezoelectric motor, and said distance change feedback sensor, wherein said optical interferometer mount includes:
    (1) a fixed mount section,
    (2) a movable mount section,
    (3) a mounting location of said beam splitter on said fixed mount section,
    (4) a mounting location of said fixed mirror on said fixed mount section,
    (5) a mounting location of said movable mirror on said movable mount section,
    (6) a mounting location of said piezoelectric motor inside of said fixed mount section, and
    (7) a mounting location of said distance change feedback sensor on said fixed mount section;
  wherein said optical interferometer determines and piezoelectrically changes magnitude of said optical path difference of said divided collimated object emission beam, for generating at least one said interference image for each said magnitude of said optical path difference, by the steps of:
    (i) displacing said movable mirror along an axis of said divided collimated object emission beam by said piezoelectric motor,
    (ii) sensing and measuring change in distance of said movable mirror along said axis by said distance change feedback sensor, and
    (iii) actuating and controlling said piezoelectric motor by said piezoelectric motor controller;
(c) camera optics, for focusing each said generated interference image associated with a corresponding said magnitude of optical path difference; and
(d) a detector, for recording each said generated interference image, for forming a plurality of recorded interference images.

55. The system of claim 54, wherein said objects inherently emit said electromagnetic radiation of said object emission beam as a result of inherent body thermal heat emitted by said objects.

56. The system of claim 54, wherein said objects emit said electromagnetic radiation of said object emission beam as a result of excitation by incident electromagnetic radiation supplied by an external source radiating said incident electromagnetic radiation upon said objects.

57. The system of claim 56, wherein said incident electromagnetic radiation is in a form of light selected from the group consisting of polychromatic light, monochromatic light, poly- or multi-monochromatic light, and, combinations thereof.

58. The system of claim 54, wherein said beam splitter is selected from the group consisting of a rectangular shaped beam splitter and a cubic shaped beam splitter.

59. The system of claim 54, wherein extent of said piezoelectrically changing said magnitude of said optical path difference of said divided collimated object emission beam along said axis is in a range of from about zero wavelengths to about ten wavelengths of said divided collimated object emission beam.

60. The system of claim 54, wherein maximum of said magnitude of said optical path difference of said divided collimated object emission beam is on order often wavelengths of said object emission beam.

61. The system of claim 54, wherein said piezoelectric motor controller operates as a closed loop controller of said change in distance of said movable mirror along said axis.

62. The system of claim 54, wherein said piezoelectric motor controller operates by applying AC voltage or current to said distance change feedback sensor.

63. The system of claim 62, wherein said AC voltage is generated by a stable sinusoidal signal generator stabilized by an amplitude stabilizer.

64. The system of claim 54, wherein said distance change feedback sensor is in a form of a capacitor sensor, including a capacitor having two plates, and being configured such that a first plate of said capacitor is connected to said movable mirror, and a second plate of said capacitor is connected to said optical interferometer mount.

65. The system of claim 64, wherein distance of said movable mirror along said axis changes via actuation and operation of said piezoelectric motor, such that distance between said two plates of said capacitor changes, causing a change in capacity concurrent with a change in potential difference existing between said two capacitor plates.

66. The system of claim 65, wherein said potential difference existing between said two capacitor plates of said distance change feedback sensor is measured by said piezoelectric motor controller.

67. The system of claim 66, wherein said actuating and controlling said piezoelectric motor by said piezoelectric motor controller is performed according to said measurement of said potential difference, and according to a required change in said distance of said movable mirror along said axis received by said piezoelectric motor controller in a form of a command sent by a signal processing unit operatively connected to said piezoelectric motor controller.

68. The system of claim 54, wherein said optical interferometer is used for performing a calibration procedure for calibrating changes in said magnitude of said optical path difference of said divided collimated object emission beam, and for calibrating said magnitude of said optical path difference of said divided collimated object emission beam, as part of said determining and piezoelectrically changing said magnitude of said optical path difference.

69. The system of claim 65, wherein said optical interferometer is used for performing a calibration procedure for calibrating changes in said magnitude of said optical path difference of said divided collimated object emission beam, and for calibrating said magnitude of said optical path difference of said divided collimated object emission beam, as part of said determining and piezoelectrically changing said magnitude of said optical path difference.

70. The system of claim 69, wherein said calibration procedure includes measuring and generating calibration values of a relationship between said potential difference existing between said two capacitor plates of said distance change feedback sensor and said optical path difference of said divided collimated object emission beam, for actuating a said change in said distance of said movable mirror along said axis.

71. The system of claim 54, wherein an electromagnetic radiation filter is placed before said camera optics, for additionally focusing electromagnetic radiation within a particular spectral region of interest of each said interference image exiting said optical interferometer.

72. The system of claim 54, wherein said optical interferometer mount further includes:

(8) a plurality of spring or spring-like motion/direction stabilizing elements, operatively connected to said fixed mount section and operatively connected to said movable mount section, for stabilizing motion and/or direction of said movable mount section and of said movable mirror during the real time hyper-spectral imaging.

73. The system of claim 54, wherein said optical interferometer mount is of a three dimensional curvilinear structure selected from the group consisting of a complex structure including a combination of at least two separate structures, and, an integral structure including a single structure or an integral combination of said at least two separate structures.

74. The system of claim 54, wherein said optical interferometer mount has a coefficient of thermal expansion of less than about $1.0 \times 10^{-4}/°$ K, thereby exhibiting high rigidity, high dimensional stability, extremely low thermal expansion, and extremely low mechanical sensitivity to temperature changes, during the real time hyper-spectral imaging, for reducing dependency of said optical path difference of said divided collimated object emission beam, and changes thereof, on said temperature changes.

75. The system of claim 54, wherein said optical interferometer mount has a coefficient of thermal expansion of less than about $1.0 \times 10^{-5}/°$ K, thereby exhibiting high rigidity, high dimensional stability, extremely low thermal expansion, and extremely low mechanical sensitivity to temperature changes, during the real time hyper-spectral imaging, for reducing dependency of said optical path difference of said divided collimated object emission beam, and changes thereof, on said temperature changes.

76. The system of claim 54, wherein said optical interferometer mount has a coefficient of thermal expansion of on order of about $1.0 \times 10^{-6}/°$ K, thereby exhibiting high rigidity, high dimensional stability, extremely low thermal expansion, and extremely low mechanical sensitivity to temperature changes, during the real time hyper-spectral imaging, for reducing dependency of said optical path difference of said divided collimated object emission beam, and changes thereof, on said temperature changes.

77. The system of claim 54, wherein said optical interferometer mount is made of an alloy or mixed metallic type of material being a stainless steel alloy including at least one metal selected from the group consisting of nickel and cobalt, wherein said material has a coefficient of thermal expansion of less than about $1.0 \times 10^{-4}/°$ K.

78. The system of claim 54, wherein said optical interferometer mount is made of an alloy or mixed metallic type of material being a stainless steel alloy selected from the group consisting of a stainless steel alloy including about 36% nickel, a stainless steel alloy including stainless steel and about 36% nickel, a stainless steel alloy including about 36% nickel and up to about 5% cobalt, and, a stainless steel alloy including steel, about 36% nickel, and up to about 5% cobalt, wherein said material has a coefficient of thermal expansion of less than about $1.0 \times 10^{-5}/°K$.

79. The system of claim 54, wherein said optical interferometer mount is made of an alloy or mixed metallic type of material being a steel alloy selected from the group consisting of an INVAR steel alloy, and an INVAR type of steel alloy, wherein said material has a coefficient of thermal expansion of on order of about $1.0 \times 10^{-6}/°K$.

80. The system of claim 54, wherein said optical interferometer mount is made of an alloy or mixed metallic type of material being a stainless steel alloy selected from the group consisting of an INVAR stainless steel alloy, and an INVAR type of stainless steel alloy, wherein said material has a coefficient of thermal expansion of on order of about $1.0 \times 10^{-6}/°K$.

81. The system of claim 80, wherein said INVAR is high purity INVAR 36, including a carbon content of less than about 0.01%.

82. The system of claim 54, wherein said optical interferometer mount is made of a solid non-metallic type of material selected from the group consisting of quartzes, glasses, ceramics, and glass ceramics.

83. An optical interferometer for real time dividing a collimated object emission beam of electromagnetic radiation emitted by objects in a scene or a sample, and, determining and piezoelectrically changing the magnitude of an optical path difference of the divided collimated object emission beam thereof, comprising:
  (a) a beam splitter, onto which the collimated object emission beam is incident, and by which the collimated object emission beam is divided into two beams;
  (b) a fixed mirror operatively positioned relative to said beam splitter;
  (c) a movable mirror operatively positioned relative to said fixed mirror and to said beam splitter, and wherein said fixed mirror and said movable mirror each receives and reflects one of said two beams, such that a difference exists in lengths of optical path traveled by said two beams exiting the optical interferometer, thereby forming the optical path difference;
  (d) a piezoelectric motor, operatively connected to said movable mirror, for displacing said movable mirror along an axis of the divided collimated object emission beam;
  (e) a distance change feedback sensor, operatively connected to said movable mirror, for sensing and measuring change in distance of said movable mirror along said axis;
  (f) a piezoelectric motor controller, operatively connected to said piezoelectric motor and to said distance change feedback sensor, for actuating and controlling said piezoelectric motor; and
  (g) an optical interferometer mount, as a mount of said beam splitter, said fixed mirror, said movable mirror, said piezoelectric motor, and said distance change feedback sensor, wherein said optical interferometer mount includes:
    (i) a fixed mount section,
    (ii) a movable mount section,
    (iii) a mounting location of said beam splitter on said fixed mount section,
    (iv) a mounting location of said fixed mirror on said fixed mount section,
    (v) a mounting location of said movable mirror on said movable mount section,
    (vi) a mounting location of said piezoelectric motor inside of said fixed mount section, and
    (vii) a mounting location of said distance change feedback sensor on said fixed mount section.

84. The optical interferometer of claim 83, wherein said beam splitter is selected from the group consisting of a rectangular shaped beam splitter and a cubic shaped beam splitter.

85. The optical interferometer of claim 83, wherein extent of the piezoelectrically changing the magnitude of the optical path difference of the divided collimated object emission beam along said axis is in a range of from about zero wavelengths to about ten wavelengths of the divided collimated object emission beam.

86. The optical interferometer of claim 83, wherein maximum of the magnitude of the optical path difference of the divided collimated object emission beam is on order of ten wavelengths of the divided collimated object emission beam.

87. The optical interferometer of claim 83, wherein said piezoelectric motor controller operates as a closed loop controller of said change in distance of said movable mirror along said axis.

88. The optical interferometer of claim 83, wherein said piezoelectric motor controller operates by applying AC voltage or current to said distance change feedback sensor.

89. The optical interferometer of claim 88, wherein said AC voltage is generated by a stable sinusoidal signal generator stabilized by an amplitude stabilizer.

90. The optical interferometer of claim 83, wherein said distance change feedback sensor is in a form of a capacitor sensor, including a capacitor having two plates, and being configured such that a first plate of said capacitor is connected to said movable mirror, and a second plate of said capacitor is connected to said optical interferometer mount.

91. The optical interferometer of claim 90, wherein distance of said movable mirror along said axis changes via actuation and operation of said piezoelectric motor, such that distance between said two plates of said capacitor changes, causing a change in capacity concurrent with a change in potential difference existing between said two capacitor plates.

92. The optical interferometer of claim 91, wherein said potential difference existing between said two capacitor plates of said distance change feedback sensor is measured by said piezoelectric motor controller.

93. The optical interferometer of claim 92, wherein said actuating and controlling said piezoelectric motor by said piezoelectric motor controller is performed according to said measurement of said potential difference, and according to a required change in said distance of said movable mirror along said axis received by said piezoelectric motor controller in a form of a command sent by a signal processing unit operatively connected to said piezoelectric motor controller.

94. The optical interferometer of claim 83, wherein the optical interferometer is used for performing a calibration procedure for calibrating changes in the magnitude of the optical path difference of the divided collimated object emission beam, and for calibrating the magnitude of the optical path difference of the divided collimated object emission beam.

95. The optical interferometer of claim 91, wherein the optical interferometer is used for performing a calibration procedure for calibrating changes in the magnitude of the optical path difference of the divided collimated object emission beam, and for calibrating the magnitude of the optical path difference of the divided collimated object emission beam.

96. The optical interferometer of claim 95, wherein said calibration procedure includes measuring and generating calibration values of a relationship between said potential difference existing between said two capacitor plates of said distance change feedback sensor and the optical path difference of the divided collimated object emission beam, for actuating a said change in said distance of said movable mirror along said axis.

97. The optical interferometer of claim 83, wherein said optical interferometer mount further includes:
(viii) a plurality of spring or spring-like motion/direction stabilizing elements, operatively connected to said fixed mount section and operatively connected to said movable mount section, for stabilizing motion and/or direction of said movable mount section and of said movable mirror.

98. The optical interferometer of claim 83, wherein said optical interferometer mount is of a three dimensional curvilinear structure selected from the group consisting of a complex structure including a combination of at least two separate structures, and, an integral structure including a single structure or an integral combination of said at least two separate structures.

99. The optical interferometer of claim 83, wherein said optical interferometer mount has a coefficient of thermal expansion of less than about $1.0 \times 10^{-4}/°K$, thereby exhibiting high rigidity, high dimensional stability, extremely low thermal expansion, and extremely low mechanical sensitivity to temperature changes, for reducing dependency of the optical path difference of the divided collimated object emission beam, and changes thereof, on said temperature changes.

100. The optical interferometer of claim 83, wherein said optical interferometer mount has a coefficient of thermal expansion of less than about $1.0 \times 10^{-5}/°K$, thereby exhibiting high rigidity, high dimensional stability, extremely low thermal expansion, and extremely low mechanical sensitivity to temperature changes, for reducing dependency of the optical path difference of the divided collimated object emission beam, and changes thereof, on said temperature changes.

101. The optical interferometer of claim 83, wherein said optical interferometer mount has a coefficient of thermal expansion of on order of about $1.0 \times 10^{-6}/°K$, thereby exhibiting high rigidity, high dimensional stability, extremely low thermal expansion, and extremely low mechanical sensitivity to temperature changes, for reducing dependency of the optical path difference of the divided collimated object emission beam, and changes thereof, on said temperature changes.

102. The optical interferometer of claim 83, wherein said optical interferometer mount is made of an alloy or mixed metallic type of material being a stainless steel alloy including at least one metal selected from the group consisting of nickel and cobalt, wherein said material has a coefficient of thermal expansion of less than about $1.0 \times 10^{-4}/°K$.

103. The optical interferometer of claim 83, wherein said optical interferometer mount is made of an alloy or mixed metallic type of material being a stainless steel alloy selected from the group consisting of a stainless steel alloy including about 36% nickel, a stainless steel alloy including stainless steel and about 36% nickel, a stainless steel alloy including about 36% nickel and up to about 5% cobalt, and, a stainless steel alloy including steel, about 36% nickel, and up to about 5% cobalt, wherein said material has a coefficient of thermal expansion of less than about $1.0 \times 10^{-5}/°K$.

104. The optical interferometer of claim 83, wherein said optical interferometer mount is made of an alloy or mixed metallic type of material being a steel alloy selected from the group consisting of an INVAR steel alloy, and an INVAR type of steel alloy, wherein said material has a coefficient of thermal expansion of on order of about $1.0 \times 10^{-6}/°K$.

105. The optical interferometer of claim 83, wherein said optical interferometer mount is made of an alloy or mixed metallic type of material being a stainless steel alloy selected from the group consisting of an INVAR stainless steel alloy, and an INVAR type of stainless steel alloy, wherein said material has a coefficient of thermal expansion of on order of about $1.0 \times 10^{-6}/°K$.

106. The optical interferometer of claim 105, wherein said INVAR is high purity INVAR 36, including a carbon content of less than about 0.01%.

107. The optical interferometer of claim 83, wherein said optical interferometer mount is made of a solid non-metallic type of material selected from the group consisting of quartzes, glasses, ceramics, and glass ceramics.

* * * * *